(12) United States Patent
Wang et al.

(10) Patent No.: US 10,333,773 B2
(45) Date of Patent: Jun. 25, 2019

(54) NODE STATE DETECTION METHOD AND DEVICE FOR NON-NETWORK POSITIONING SYSTEM

(71) Applicant: Siemens Aktiengesellschaft, Munich (DE)

(72) Inventors: Yang Wang, Suzhou (CN); Liang Zhang, Beijing (CN)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 15/673,473

(22) Filed: Aug. 10, 2017

(65) Prior Publication Data

US 2018/0054349 A1    Feb. 22, 2018

(30) Foreign Application Priority Data

Aug. 17, 2016    (CN) .......................... 2016 1 0683170

(51) Int. Cl.
| | |
|---|---|
| *H04L 12/24* | (2006.01) |
| *H04L 12/26* | (2006.01) |
| *H04L 12/707* | (2013.01) |
| *H04W 4/02* | (2018.01) |
| *H04W 40/20* | (2009.01) |
| *H04W 4/04* | (2009.01) |
| *H04W 4/029* | (2018.01) |
| *H04W 84/00* | (2009.01) |

(52) U.S. Cl.
CPC ...... *H04L 41/0668* (2013.01); *H04L 43/0817* (2013.01); *H04L 45/22* (2013.01); *H04W 4/023* (2013.01); *H04W 4/025* (2013.01); *H04W 4/029* (2018.02); *H04W 4/04* (2013.01); *H04W 40/20* (2013.01); *H04W 84/005* (2013.01)

(58) Field of Classification Search
CPC . H04L 41/0668; H04L 45/22; H04L 43/0817; H04W 4/029; H04W 4/04; H04W 4/025; H04W 4/023; H04W 40/20; H04W 84/005
See application file for complete search history.

(56) References Cited

U.S. PATENT DOCUMENTS

| | | | |
|---|---|---|---|
| 2006/0087474 A1* | 4/2006 | Do | .......................... G01S 1/024 342/386 |
| 2015/0247913 A1 | 9/2015 | Messier et al. | |
| 2015/0269638 A1 | 9/2015 | Chatterton et al. | |

OTHER PUBLICATIONS

Extended European Search Report dated Oct. 18, 2017.

\* cited by examiner

*Primary Examiner* — Afshawn M Towfighi
(74) *Attorney, Agent, or Firm* — Harness, Dickey & Pierce, P.L.C.

(57) ABSTRACT

Embodiments provide a node state detection method and device for detecting a running state of a target node in a non-network positioning system. The method includes: acquiring signal data, the signal data including data of at least one wireless signal received by a data acquisition terminal during one movement within the system. The data acquisition terminal is configured to pass through the target node during the movement. The method further includes determining whether the acquired signal data includes a feature indicated by standard signal feature information and determining the running state of the target node according to a determination result. The embodiments achieve automatic detection on a running state of a node in the non-network positioning system.

20 Claims, 10 Drawing Sheets

NODE STATE DETECTION METHOD AND DEVICE FOR NON-NETWORK POSITIONING SYSTEM

PRIORITY STATEMENT

The present application hereby claims priority under 35 U.S.C. § 119 to Chinese patent application number CN 201610683170.3 filed Aug. 17, 2016, the entire contents of which are hereby incorporated herein by reference.

FIELD

At least one embodiment of the present invention generally relates to a non-network positioning system, and in particular to a node state detection method and device for a non-network positioning system.

BACKGROUND

Generally at least two nodes exist in a non-network positioning system, and a network is constituted without the need of communication between the nodes. A moving object passing through a positioning region of the system is positioned by the nodes emitting a signal. For example: the iBEACON system launched by Apple Inc. is a non-network positioning system.

Nodes deployed at various places of the iBEACON system emit wireless signals, the signals containing information such as identification of the nodes, etc. A moving object to be positioned receives the signals emitted by these nodes, and sends signal data of the received signals to a positioning device in the iBEACON system. The positioning device may position the moving object by analysing the signal data. Since no network needs to be deployed for the non-network positioning system, the system is easy to deploy and can be applied to a complicated environment, for example, it can be used in a factory to position a material transport truck. In addition, the system is strong in extensibility. If a new node needs to be added, it may be placed in a required position, without the need for network configuration.

SUMMARY

However, the inventors have recognized that since the various nodes in the non-network positioning system cannot be in communication with each other, when one node has failed, the state of the failed node cannot be reported via the other nodes. At present, the running state of a node can only be diagnosed via artificial maintenance, which has the disadvantages of low efficiency, not being timely and poor in operability.

In view of this, at least one embodiment of the present invention proposes a node state detection method and device for a non-network positioning system, for at least improving upon of solving one or more of the defects in the prior art, and achieving automatic diagnosis of a node running state.

An embodiment of the present invention provides a node state detection method for detecting a running state of a target node of at least two nodes included in a non-network positioning system, the at least two nodes being located in different positions within the system respectively and both sending a wireless signal, the method comprising: acquiring signal data, the signal data comprising data of at least one wireless signal received by a data acquisition terminal during one movement within the system, wherein the data acquisition terminal passes through the target node during the movement; determining whether the acquired signal data has a feature indicated by standard signal feature information; and determining the running state of the target node according to a determination result, wherein the standard signal feature information is used for indicating: a feature of data of at least one wireless signal from the target node received by the data acquisition terminal and/or another at least one data acquisition terminal, when the target node is in a normal running state.

An embodiment of the present invention further provides a node state detection device for detecting a running state of a target node of at least two nodes included in a non-network positioning system, the at least two nodes being located in different positions within the system respectively and both sending a wireless signal, the device comprising: a first acquisition module for acquiring signal data, the signal data comprising data of at least one wireless signal received by a data acquisition terminal during one movement within the system, wherein the data acquisition terminal passes through the target node during the movement; and a first determination module for determining whether the acquired signal data has a feature indicated by standard signal feature information, and determining the running state of the target node according to a determination result, wherein the standard signal feature information is used for indicating: a feature of data of at least one wireless signal from the target node received by the data acquisition terminal and/or another at least one data acquisition terminal, when the target node is in a normal running state.

An embodiment of the present invention further provides a node state detection device for detecting a running state of a target node of at least two nodes included in a non-network positioning system, the at least two nodes being located in different positions within the system respectively and both sending a wireless signal. The node state detection device comprises a memory and at least one processor. The memory is used for storing a program comprising computer executable instructions. The processor is used for calling the program to carry out all or some steps of the method of various embodiments of the present invention.

An embodiment of the present invention further provides a non-network positioning system, comprising: at least two nodes, a data storage and positioning device and a node state detection device in any one of the aforementioned embodiments. The at least two nodes are located in different positions within the system respectively and both send a wireless signal. The data storage and positioning device is used for storing signal data, and performing positioning according to the signal data, wherein the signal data comprises data of at least one wireless signal received by a data acquisition terminal during one movement within the system, wherein the data acquisition terminal passes through the target node during the movement.

In one embodiment, the system further comprises the data acquisition terminal.

An embodiment of the present invention further provides a computer readable medium, the computer readable medium storing computer instructions thereon, the computer instructions, when executed by a processor, causing the processor to perform the node state detection method in any one of the aforementioned embodiments.

BRIEF DESCRIPTION OF THE ACCOMPANYING DRAWINGS

Example embodiments of the present invention are hereinafter described in detail with reference to the accompanying drawings so as to make the above and other features and advantages thereof more apparent for those of ordinary skill in the art. In the accompanying drawings.

DESCRIPTION OF REFERENCE NUMERALS

Figure 1A:
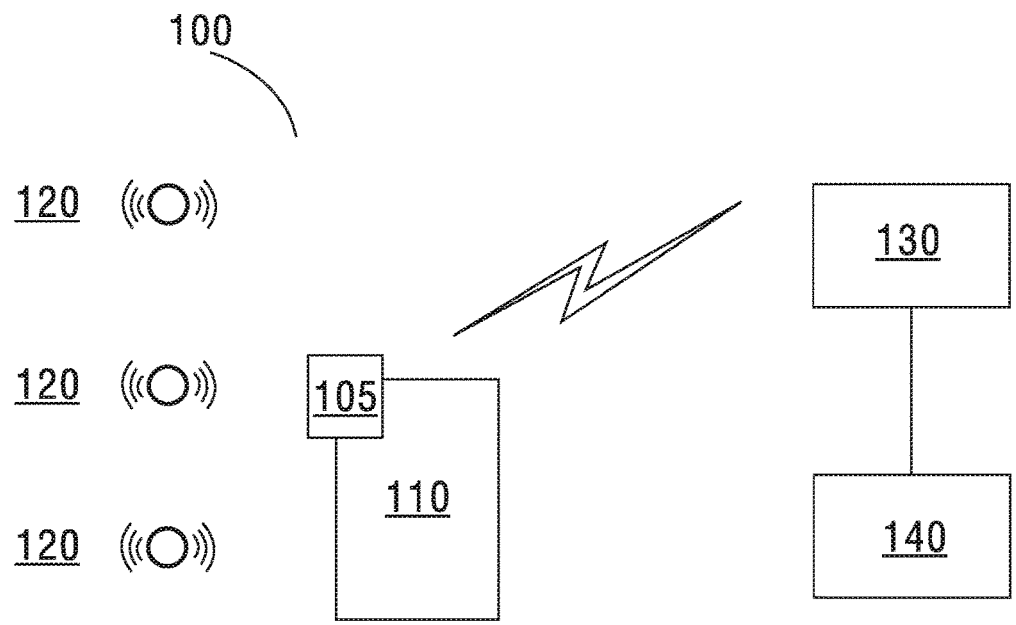
FIG. 1a is a schematic structural diagram of a non-network positioning system provided by an embodiment of the present invention.

100 Non-network positioning system
105 Data acquisition terminal
110 Moving object
120 Node
130 Data storage and positioning device
140 Node state detection device
142 Acquiring first data
144 Preliminary determination
146 Acquiring second data
148 State confirmation
210 Acquiring signal data
220 Feature comparison and determining a running state
310 Acquiring first data
320 Performing feature comparison according to first visible node signal feature information and determining a first running state
322 The first data comprise data of a target node?
324 Failure state
326 Performing feature comparison according to first visible node signal feature information
510 Acquiring first data
520 Performing feature comparison according to first node path binding information and determining a first running state
522 The first data comprise data of a target node?
524 Failure state
526 Performing feature comparison according to first node path binding information
710 A failure state?
720 Acquiring second data
730 Performing feature comparison according to second visible node signal feature information and determining a second running state
810 A failure state?
820 Acquiring second data
830 Performing feature comparison according to first node path binding information and determining a second running state
910 A failure state?
920 Acquiring second data
930 Performing feature comparison according to second node path binding information and determining a second running state
1010 A failure state?
1020 Acquiring second data
1030 Performing feature comparison according to first visible node signal feature information and determining a second running state
1110 Acquiring data of a third node
1120 Performing feature comparison according to third visible node signal feature information
1130 Determining whether to pass through a target node
1210 Determining a path
1220 determining whether the target node is on the path
1230 Determining whether to pass through the target node
1410 First acquisition module
1420 First determination module
1440 Second determination module
1450 Second acquisition module
1460 Third determination module
1510 Third acquisition module
1520 Fourth determination module
1530 First determination module
1610 Second determination module
1620 Fifth determination module
1630 Third determination module
1710 Memory
1720 Processor
1730 Interface
1732 Interface
1734 Interface

DETAILED DESCRIPTION OF THE EXAMPLE EMBODIMENTS

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Various example embodiments will now be described more fully with reference to the accompanying drawings in which only some example embodiments are shown. Specific structural and functional details disclosed herein are merely representative for purposes of describing example embodiments. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated. The present invention, however, may be embodied in many alternate forms and should not be construed as limited to only the example embodiments set forth herein.

It will be understood that, although the terms first, second, etc. may be used herein to describe various elements, components, regions, layers, and/or sections, these elements, components, regions, layers, and/or sections, should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items. The phrase "at least one of" has the same meaning as "and/or".

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Also, the term "exemplary" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Before discussing example embodiments in more detail, it is noted that some example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments of the present invention. This invention may, however, be embodied in many alternate forms and should not be construed as limited to only the embodiments set forth herein.

Units and/or devices according to one or more example embodiments may be implemented using hardware, software, and/or a combination thereof. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner. Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

Even further, any of the disclosed methods may be embodied in the form of a program or software. The program or software may be stored on a non-transitory computer readable medium and is adapted to perform any one of the aforementioned methods when run on a computer device (a device including a processor). Thus, the non-transitory, tangible computer readable medium, is adapted to store information and is adapted to interact with a data processing facility or computer device to execute the program of any of the above mentioned embodiments and/or to perform the method of any of the above mentioned embodiments.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as a computer processing device or processor; however, one skilled in the art will appreciate that a hardware device may include multiple processing elements or processors and multiple types of processing elements or processors. For example, a hardware device may include multiple processors or a processor and a controller. In addition, other processing configurations are possible, such as parallel processors.

The computer programs include processor-executable instructions that are stored on at least one non-transitory computer-readable medium (memory). The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc. As such, the one or more processors may be configured to execute the processor executable instructions.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

Further, at least one embodiment of the invention relates to the non-transitory computer-readable storage medium including electronically readable control information (processor executable instructions) stored thereon, configured in such that when the storage medium is used in a controller of a device, at least one embodiment of the method may be carried out.

The computer readable medium or storage medium may be a built-in medium installed inside a computer device main body or a removable medium arranged so that it can be separated from the computer device main body. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The term code, as used above, may include software, firmware, and/or microcode, and may refer to programs, routines, functions, classes, data structures, and/or objects.

Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

An embodiment of the present invention provides a node state detection method for detecting a running state of a target node of at least two nodes included in a non-network positioning system, the at least two nodes being located in different positions within the system respectively and both sending a wireless signal, the method comprising: acquiring signal data, the signal data comprising data of at least one wireless signal received by a data acquisition terminal during one movement within the system, wherein the data acquisition terminal passes through the target node during the movement; determining whether the acquired signal data has a feature indicated by standard signal feature information; and determining the running state of the target node according to a determination result, wherein the standard signal feature information is used for indicating: a feature of data of at least one wireless signal from the target node received by the data acquisition terminal and/or another at least one data acquisition terminal, when the target node is in a normal running state.

In the node state detection method provided by an embodiment of the present invention, by receiving data of a wireless signal from a node of a non-network positioning system by a data acquisition terminal during the movement of a moving object and comparing the signal data with standard signal feature information, a running state of the node is determined, so that a failed node can be found in time, without the need to wait until artificial maintenance for the running state of the node to be diagnosed, which achieves automatic diagnosis of running states of various nodes in the non-network positioning system.

In an embodiment of the present invention, the standard signal feature information comprises visible node signal feature information and/or node path binding information, wherein the visible node signal feature information is used for indicating: a feature of data of at least one wireless signal from the target node received by the data acquisition terminal and/or another at least one data acquisition terminal when passing through at least one visible node of the target node, when the target node is in the normal running state. The node path binding information is used for indicating: a feature of data of at least one wireless signal from the target node received by the data acquisition terminal and/or another at least one data acquisition terminal when passing through a path where the target node is located, when the target node is in the normal running state.

A variety of modes of node running state determination are further provided by determining the running state of the target node by way of the data of the wireless signal received by the data acquisition terminal from the visible node of the target node or on the path where the target node is located. Either the visible node of the target node or the path where the target node is located are related to the target node. By discovering and extracting a feature of information about the visible node and the path related to the target node, and determining whether the data of the signal from the target node received by the node acquisition terminal during the movement of the non-network positioning system has the feature, the target node is associated with the other nodes in the non-network positioning system, thereby effectively achieving node failure determination.

In one embodiment, the standard signal feature information comprises visible node signal feature information. First data is acquired, the first data comprising data of at least one wireless signal received by the data acquisition terminal when passing through at least one first node of the at least two nodes during the movement, wherein the target node is visible to each of the at least one first node. Then, it is determined whether the first data has a feature indicated by first visible node signal feature information, and a first running state of the target node is determined according to the determination result, wherein the first visible node signal feature information is used for indicating: a feature of data of a wireless signal from the target node received by the data acquisition terminal and/or another at least one data acquisition terminal when passing through the at least one first node, when the target node is in a normal running state. Thus, the running state of the target node can be determined by utilizing visible node signal feature information, which achieves automatic diagnosis of the running states of various nodes in the non-network positioning system.

In one embodiment, determining whether the first data has first visible node signal feature information, and determining a first running state of the target node according to the determination result comprises: if the first data does not comprise the data of the wireless signal from the target node, determining the first running state of the target node as a failure state; and if the first data comprises the data of the wireless signal from the target node, determining whether the data of the wireless signal from the target node included in the first data has the feature indicated by the first visible node signal feature information, and if not, determining the first running state of the target node as a failure state.

In one embodiment, the standard signal feature information comprises node path binding information. First data is acquired, the first data comprising data of at least one wireless signal from the target node received by the data acquisition terminal when passing through a first path, where the target node is located, during the movement. Then, it is determined whether the first data has a feature indicated by first node path binding information, and a first running state of the target node is determined according to the determination result, wherein the first node path binding information is used for indicating: a feature of data of at least one wireless signal from the target node received by the data acquisition terminal and/or another at least one data acquisition terminal when passing through the first path, when the target node is in a normal running state. Thus, the running state of the target node can be determined by utilizing node path binding information, which achieves automatic diagnosis of the running states of various nodes in the non-network positioning system.

In one embodiment, determining whether the first data has a feature indicated by first node path binding information, and determining a first running state of the target node according to the determination result may comprise: if the first data does not comprise the data of the wireless signal from the target node, determining the first running state of the target node as a failure state; and if the first data comprises the data of the signal from the target node, determining whether the data of the wireless signal from the target node included in the first data has the feature indicated by the first node path binding information, and if not, determining the first running state of the target node as a failure state.

In one embodiment, after determining a first running state of a target node by utilizing visible node signal feature information based on data of a wireless signal from the target node received by a data acquisition terminal when passing through a first node, whether the first running state is a failure state may further be determined; and if the first running state is a failure state, then second data is acquired, the second data comprising data of at least one wireless signal received by the data acquisition terminal when passing through at least one second node of the at least two nodes during the movement, wherein the target node is visible to each of the at least one second node, and the at least one second node is different from each of the at least one first node. Then, it is determined whether the second data has a feature indicated by second visible node signal feature information, and a second running state of the target node is determined according to the determination result, wherein the second visible node signal feature information is used for indicating: a feature of data of a wireless signal from the target node received by the data acquisition terminal and/or another at least one data acquisition terminal when passing through the at least one second node, when the target node is in a normal running state. Thus, after preliminary determination is performed on the running state of the target node based on the data of the wireless signal from the target node received by the data acquisition terminal when passing through the first node to obtain a first running state, the running state of the target node may then be further confirmed based on the data of the wireless signal received from the target node when the data acquisition terminal passes through a second node which is different from the first node, so that the accuracy of a detection result can be improved.

In one embodiment, determining whether the second data has second visible node signal feature information, and determining a second running state of the target node according to the determination result comprises: if the second data does not comprise the data of the wireless signal from the target node, determining the second running state of the target node as a failure state; and if the second data comprises the data of the signal from the target node, determining whether the data of the signal from the target node included in the second data has the feature indicated by the second visible node signal feature information, and if not, determining the second running state of the target node as a failure state.

In one embodiment, after determining a first running state of a target node by utilizing visible node signal feature information, whether the first running state is a failure state may further be determined; if the first running state is a failure state, then second data is acquired, the second data comprising data of at least one wireless signal from the target node received by the data acquisition terminal when passing through a first path where the target node is located during the movement; and determining whether the second data has a feature indicated by first node path binding information, and determining a second running state of the target node according to the determination result, wherein the first node path binding information is used for indicating: a feature of data of at least one wireless signal from the target node received by the data acquisition terminal and/or another at least one data acquisition terminal when passing through the first path, when the target node is in a normal running state. Thus, after preliminary determination is performed on the running state of the target node by utilizing the visible node signal feature information based on the data of the wireless signal from the target node received by the data acquisition terminal when passing through the first node to obtain a first running state, the running state of the target node may then be further confirmed by utilizing node path binding information based on the data of the wireless signal from the target node received by the data acquisition terminal when passing through a first path where the target node is located, so that the accuracy of a detection result can be improved.

In one embodiment, after determining a first running state of a target node by utilizing data of a wireless signal from the target node received by the data acquisition terminal when passing through a first path where the target node is located, whether the first running state is a failure state may further be determined; if the first running state is a failure state, then second data is acquired, the second data comprising data of at least one wireless signal from the target node received by the data acquisition terminal when passing through a second path where the target node is located during the movement, wherein the second path is different from the first path; and determining whether the second data has a feature indicated by second node path binding information, and determining a second running state of the target node according to the determination result, wherein the second node path binding information is used for indicating: a feature of data of at least one wireless signal from the target node received by the data acquisition terminal and/or another at least one data acquisition terminal when passing through the second path, when the target node is in a normal running state. Thus, after preliminary determination is performed on the running state of the target node by utilizing the data of the wireless signal from the target node received by the data acquisition terminal when passing through the first path where the target node is located to obtain a first running state, the running state of the target node may then be further confirmed based on the wireless signal from the target node received by the data acquisition terminal when passing through a second path where the target node is located, so that the accuracy of a detection result can be improved.

In one embodiment, when the target node is a visible node, after determining a first running state of the target node by utilizing node path binding information, whether the first running state is a failure state may further be determined; if the first running state is a failure state, then second data is acquired, the second data comprising data of at least one wireless signal received by the data acquisition terminal when passing through at least one first node of the at least two nodes during the movement, wherein the target node is visible to each of the at least one first node; and determining whether the second data has a feature indicated by first visible node signal feature information, and determining a second running state of the target node according to the determination result, wherein the first visible node signal feature information is used for indicating: a feature of data of a wireless signal from the target node received by the data acquisition terminal and/or another at least one data acquisition terminal when passing through the at least one first node, when the target node is in a normal running state. Thus, after preliminary determination that the first running state of the target node is a failure state is performed by utilizing the node path binding information based on the data of the wireless signal from the target node received by the data acquisition terminal when passing through the first path where the target node is located, the running state of the target node can then be further confirmed by utilizing the visible node signal feature information based on the wireless signal from the target node received by the data acquisition terminal when passing through a first node, so that the accuracy of a detection result can be improved.

In one embodiment, after determining the running state of the target node as a failure state according to the determination result, data of at least one wireless signal received by the data acquisition terminal from at least one third node of the at least two nodes during the movement is further acquired, wherein the at least one third node is visible to the target node; it is determined whether the acquired data of the at least one wireless signal from the at least one third node comprises data having a feature indicated by third visible node signal feature information, wherein the third visible node signal feature information about one third node is used for indicating: a feature of data of a wireless signal from the third node received by the data acquisition terminal and/or another at least one data acquisition terminal when passing through the target node, when the third node is in a normal running state; and when the acquired data of the at least one wireless signal from the at least one third node comprises the data having the feature indicated by the third visible node signal feature information, it is determined that the data acquisition terminal passes through the target node during the movement. Thus, when the target node has failed, whether the data acquisition terminal has passed through the target node may still be determined by utilizing the visible node signal feature information, so that the non-network positioning system has a self-healing ability, and the reliability of the non-network positioning system is further improved.

In one embodiment, after determining the running state of the target node as a failure state according to the determination result, a path through which the data acquisition terminal passes during the movement is further determined; it is determined whether the target node is on the determined path; and if the target node is on the path, it is determined that the data acquisition terminal passes through the target node during the movement. Thus, when the target node has failed, whether the data acquisition terminal has passed through the target node may still be determined by utilizing the node path binding information, so that the non-network positioning system has a self-healing ability, and the reliability of the non-network positioning system is further improved.

An embodiment of the present invention further provides a node state detection device for detecting a running state of a target node of at least two nodes included in a non-network positioning system, the at least two nodes being located in different positions within the system respectively and both sending a wireless signal, the device comprising: a first acquisition module for acquiring signal data, the signal data comprising data of at least one wireless signal received by a data acquisition terminal during one movement within the system, wherein the data acquisition terminal passes through the target node during the movement; and a first determination module for determining whether the acquired signal data has a feature indicated by standard signal feature information, and determining the running state of the target node according to a determination result, wherein the standard signal feature information is used for indicating: a feature of data of at least one wireless signal from the target node received by the data acquisition terminal and/or another at least one data acquisition terminal, when the target node is in a normal running state.

In the node state detection device provided by the embodiment of the present invention, by receiving data of a wireless signal from a node of a non-network positioning system by a data acquisition terminal during the movement of a moving object and comparing the signal data with standard signal feature information, a running state of the node is determined, so that a failed node can be found in time, without the need to wait until artificial maintenance for the running state of the node to be diagnosed, which achieves automatic diagnosis of running states of various nodes in the non-network positioning system.

In an embodiment of the present invention, the standard signal feature information used when the first determination module determines whether the acquired signal data has a feature indicated by standard signal feature information comprises visible node signal feature information and/or node path binding information, wherein the visible node signal feature information is used for indicating: a feature of data of at least one wireless signal from the target node received by the data acquisition terminal and/or another at least one data acquisition terminal when passing through at least one visible node of the target node, when the target node is in the normal running state. The node path binding information is used for indicating: a feature of data of at least one wireless signal from the target node received by the data acquisition terminal and/or another at least one data acquisition terminal when passing through a path where the target node is located, when the target node is in the normal running state.

A variety of modes of node running state determination are further provided by determining the running state of the target node by way of the data of the wireless signal received by the data acquisition terminal from the visible node of the target node or on the path where the target node is located. Either the visible node of the target node or the path where the target node is located are related to the target node. By discovering and extracting a feature of information about the visible node and the path related to the target node, and determining whether the data of the signal from the target node received by the node acquisition terminal during the movement of the non-network positioning system has the feature, the target node is associated with the other nodes in the non-network positioning system, thereby effectively achieving node failure determination.

In one embodiment, the standard signal feature information used when the first determination module determines whether the acquired signal data has a feature indicated by standard signal feature information comprises visible node signal feature information, and the acquisition module is used for acquiring first data, the first data comprising data of at least one wireless signal received by the data acquisition terminal when passing through at least one first node of the at least two nodes during the movement, wherein the target node is visible to each of the at least one first node; and the first determination module is used for determining whether the first data has a feature indicated by first visible node signal feature information, and determining a first running state of the target node according to the determination result, wherein the first visible node signal feature information is used for indicating: a feature of data of a wireless signal from the target node received by the data acquisition terminal and/or another at least one data acquisition terminal when passing through the at least one first node, when the target node is in a normal running state. Thus, the running state of the target node can be determined by utilizing visible node signal feature information, which achieves automatic diagnosis of the running states of various nodes in the non-network positioning system.

In one embodiment, the first determination module is used for: if the first data does not comprise the data of the wireless signal from the target node, determining the first running state of the target node as a failure state; and if the first data comprises the data of the wireless signal from the target node, determining whether the data of the wireless signal from the target node included in the first data has the feature indicated by the first visible node signal feature information, and if not, determining the first running state of the target node as a failure state.

In one embodiment, the standard signal feature information used when the first determination module determines whether the acquired signal data has a feature indicated by standard signal feature information comprises node path binding information; the acquisition module is used for acquiring first data, the first data comprising data of at least one wireless signal from the target node received by the data acquisition terminal when passing through a first path, where the target node is located, during the movement; and the first determination module is used for determining whether the first data has a feature indicated by first node path binding information, and determining a first running state of the target node according to the determination result, wherein the first node path binding information is used for indicating: a feature of data of at least one wireless signal from the target node received by the data acquisition terminal and/or another at least one data acquisition terminal when passing through the first path, when the target node is in a normal running state. Thus, the running state of the target node can be determined by utilizing node path binding information, which achieves automatic diagnosis of the running states of various nodes in the non-network positioning system.

In one embodiment, the first determination module is used for: if the first data does not comprise the data of the wireless signal from the target node, determining the first running state of the target node as a failure state; and if the first data comprises the data of the signal from the target node, determining whether the data of the wireless signal from the target node included in the first data has the feature indicated by the first node path binding information, and if not, determining the first running state of the target node as a failure state.

In one embodiment, the node state detection device further comprises a second determination module, a second acquisition module and a third determination module. After the first determination module determines a first running state of a target node by utilizing visible node signal feature information based on data of a wireless signal from the target node received by a data acquisition terminal when passing through a first node, the second determination module is used for determining whether the first running state is a failure state. The second acquisition module is used for acquiring second data when the first running state is a failure state, the second data comprising data of at least one wireless signal received by the data acquisition terminal when passing through at least one second node of the at least two nodes during the movement, wherein the target node is visible to each of the at least one second node, and the at least one second node is different from each of the at least one first node. The third determination module is used for determining whether the second data has a feature indicated by second visible node signal feature information, and determining a second running state of the target node according to the determination result, wherein the second visible node signal feature information is used for indicating: a feature of data of a wireless signal from the target node received by the data acquisition terminal and/or another at least one data acquisition terminal when passing through the at least one second node, when the target node is in a normal running state. Thus, after preliminary determination is performed on the running state of the target node based on the data of the wireless signal from the target node received by the data acquisition terminal when passing through the first node to obtain a first running state, the running state of the target node may then be further confirmed based on the data of the wireless signal from the target node received by the data acquisition terminal when passing through a second node which is different from the first node, so that the accuracy of a detection result can be improved.

In one embodiment, the third determination module may specifically be used for: if the second data does not comprise the data of the wireless signal from the target node, determining the second running state of the target node as a failure state; and if the second data comprises the data of the signal from the target node, determining whether the data of the signal from the target node included in the second data has the feature indicated by the second visible node signal feature information, and if not, determining the second running state of the target node as a failure state.

In one embodiment, the node state detection device further comprises a second determination module, a second acquisition module and a third determination module. After the first determination module determines a first running state of a target node by utilizing visible node signal feature information based on data of a wireless signal from the target node received by a data acquisition terminal when passing through a first node, the second determination module is used for determining whether the first running state is a failure state. The second acquisition module is used for acquiring second data when the first running state is a failure state, the second data comprising data of at least one wireless signal from the target node received by the data acquisition terminal when passing through a first path where the target node is located during the movement. The third determination module is used for determining whether the second data has a feature indicated by first node path binding information, and determining a second running state of the target node according to the determination result, wherein the first node path binding information is used for indicating: a feature of data of at least one wireless signal from the target node received by the data acquisition terminal and/or another at least one data acquisition terminal when passing through the first path, when the target node is in a normal running state. Thus, after preliminary determination is performed on the running state of the target node based on the data of the wireless signal from the target node received by the data acquisition terminal when passing through the first node to obtain a first running state, the running state of the target node may then be further confirmed by utilizing node path binding information based on the data of the wireless signal from the target node received by the data acquisition terminal when passing through a first path where the target node is located, so that the accuracy of a detection result can be improved.

In one embodiment, the node state detection device further comprises a second determination module, a second acquisition module and a third determination module. After the first determination module determines a first running state of a target node by utilizing data of a wireless signal from the target node received by the data acquisition terminal when passing through a first path where the target node is located, the second determination module is used for determining whether the first running state is a failure state. The second acquisition module is used for acquiring second data when the first running state is a failure state, the second data comprising data of at least one wireless signal from the target node received by the data acquisition terminal when passing through a second path where the target node is located during the movement, wherein the second path is different from the first path. The third determination module is used for determining whether the second data has a feature indicated by second node path binding information, and determining a second running state of the target node according to the determination result, wherein the second node path binding information is used for indicating: a feature of data of at least one wireless signal from the target node received by the data acquisition terminal and/or another at least one data acquisition terminal when passing through the second path, when the target node is in a normal running state. Thus, after preliminary determination is performed on the running state of the target node by utilizing the data of the wireless signal from the target node received by the data acquisition terminal when passing through the first path where the target node is located, so as to obtain a first running state, the running state of the target node may be further confirmed based on the wireless signal from the target node received by the data acquisition terminal when passing through a second path where the target node is located, so that the accuracy of a detection result can be improved.

In one embodiment, the node state detection device further comprises a second determination module, a second acquisition module and a third determination module. After the first determination module determines a first running state of the target node by utilizing node path binding information, the second determination module is used for determining whether the first running state is a failure state. The second acquisition module is used for acquiring second data when the first running state is a failure state, the second data comprising data of at least one wireless signal received by the data acquisition terminal when passing through at least one first node of the at least two nodes during the movement, wherein the target node is visible to each of the at least one first node. The third determination module is used for determining whether the second data has a feature indicated by first visible node signal feature information, and determining a second running state of the target node according to the determination result obtained by the third determination module, wherein the first visible node signal feature information is used for indicating: a feature of data of a wireless signal from the target node received by the data acquisition terminal and/or another at least one data acquisition terminal when passing through the at least one first node, when the target node is in a normal running state. The second determination module is used for determining the second running state of the target node according to the determination result obtained by the third determination module. Thus, after preliminary determination that the first running state of the target node is a failure state is performed by utilizing the node path binding information based on the data of the wireless signal from the target node received by the data acquisition terminal when passing through the first path where the target node is located, the running state of the target node can then be further confirmed by utilizing the visible node signal feature information based on the wireless signal from the target node received by the data acquisition terminal when passing through a first node, so that the accuracy of a detection result can be improved.

In one embodiment, the node state detection device further comprises: a third acquisition module for acquiring data of at least one wireless signal from at least one third node of the at least two nodes received by the data acquisition terminal during the movement when the running state of the target node is determined as a failure state according to the determination result, wherein the at least one third node is visible to the target node; a fourth determination module for determining whether the acquired data comprises data having a feature indicated by third visible node signal feature information, wherein the third visible node signal feature information is used for indicating: when the third node is in a normal running state, a feature of data of a wireless signal from the third node received by the data acquisition terminal and/or another at least one data acquisition terminal when passing through the target node; and a first determination module for determining that the data acquisition terminal passes through the target node during the movement when the acquired data comprises the data having the feature indicated by the third visible node signal feature information. Thus, when the target node has failed, whether the data acquisition terminal has passed through the target node may still be determined by utilizing the visible node signal feature information, so that the non-network positioning system has a self-healing ability, and the reliability of the non-network positioning system is further improved.

In one embodiment, the node state detection device further comprises: a second determination module for determining a path through which the data acquisition terminal passes during the movement when the running state of the target node is determined as a failure state according to the determination result; a fifth determination module for determining whether the target node is on the determined path; and a third determination module for, if the target node is on the determined path, determining that the data acquisition terminal passes through the target node during the movement. Thus, when the target node has failed, whether the data acquisition terminal has passed through the target node may still be determined by utilizing the node path binding information, so that the non-network positioning system has a self-healing ability, and the reliability of the non-network positioning system is further improved.

An embodiment of the present invention further provides a node state detection device for detecting a running state of a target node of at least two nodes included in a non-network positioning system, the at least two nodes being located in different positions within the system respectively and both sending a wireless signal. The node state detection device comprises a memory and at least one processor. The memory is used for storing a program comprising computer executable instructions. The processor is used for calling the program to carry out all or some steps of the method of various embodiments of the present invention.

An embodiment of the present invention further provides a non-network positioning system, comprising: at least two nodes, a data storage and positioning device and a node state detection device in any one of the aforementioned embodiments. The at least two nodes are located in different positions within the system respectively and both send a wireless signal. The data storage and positioning device is used for storing signal data, and performing positioning according to the signal data, wherein the signal data comprises data of at least one wireless signal received by a data acquisition terminal during one movement within the system, wherein the data acquisition terminal passes through the target node during the movement.

In one embodiment, the system further comprises the data acquisition terminal.

An embodiment of the present invention further provides a computer readable medium, the computer readable medium storing computer instructions thereon, the computer instructions, when executed by a processor, causing the processor to perform the node state detection method in any one of the aforementioned embodiments.

As mentioned before, in the existing non-network positioning system, various nodes cannot be in communication with each other, and when one node has failed, the state of the failed node cannot be reported via the other nodes, and thus it is not possible to perform automatic determination on a node failure.

In an embodiment of the present invention, a wireless signal of a target node is compared with standard signal feature information about the target node in normal running, so as to determine the running state of the target node, wherein the target node is a node needing to be subjected to running state detection; the standard signal feature information is used for indicating: when the target node is in a normal running state, a feature of data of at least one wireless signal from the target node received by the data acquisition terminal.

In an embodiment of the present invention, the standard signal feature information may comprise: visible node signal feature information and/or node path binding information. Correspondingly, the feature comparison may also be performed in two ways: method I, the wireless signal from the target node may be compared with a feature indicated by corresponding visible node signal feature information, so as to determine whether the target node has a corresponding feature; and method II, the wireless signal from the target node may be compared with a feature indicated by corresponding node path binding information, so as to determine whether the target node has a corresponding feature. Then, a detection result may be obtained by determining the running state of the target node according to a determination result.

As shown in FIG. 1a, it is a schematic structural diagram of a non-network positioning system provided by an embodiment of the present invention. The non-network positioning system 100 of this embodiment can be used for positioning a moving object 110. The non-network positioning system 100 may be deployed in a commercial building or deployed in a complicated factory environment according to requirements, and the moving object 110 may be any moving object needing to be positioned, for example, a transport device running in a factory, and no limitation is imposed on this by the present invention. The non-network positioning system 100 comprises at least two nodes 120, a data storage and positioning device 130 and a node state detection device 140. In addition, a data acquisition terminal 105 may be a constituent part of the system 100, and may also not be a constituent part of the system 100. The at least two nodes 120 mentioned above may be located in different positions in the non-network positioning system 100. In practical deployment, different numbers of nodes 120 may be deployed according to the size of coverage range and positioning precision of the non-network positioning system 100, and an object in the non-network positioning system 100, such as: positions of devices running in a factory, so as to satisfy positioning requirements.

In the system, the various nodes 120 emit wireless signals for positioning the moving object, and the number and positions of the nodes can be set according to requirements. The data acquisition terminal 105 is located on the moving object 110 to be positioned, which moves with the moving object 110, i.e. a moving path of the data acquisition terminal 105 is the same as that of the moving object 110. The data acquisition terminal 105 may be fixedly or detachably mounted on the moving object, or may be carried by an operator who operates the moving object, for example, when the moving object is a transport device in a factory, the data acquisition terminal may be carried by a driver of the transport device.

The nodes 120 may periodically send wireless signals. When the data acquisition terminal 105 passes through one node 120, i.e. when he data acquisition terminal 105 is located within the coverage range of the node 120, generally at least one wireless signal from the node may be received. In specific implementation, a variety of methods may be used to determine whether the data acquisition terminal 105 when passing through a certain node 120 or whether it is located within the coverage range of a certain node 120, for example, a wireless signal strength from the node 120 received by the data acquisition terminal 105, i.e. a received signal strength indication (RSSI), may be compared with a pre-determined threshold value, and if the wireless signal strength from the node 120 is greater than the pre-determined threshold value, then it may be considered that the data acquisition terminal 105 when passing through the node 120, or to say that the data acquisition terminal 105 is located within the coverage range of the node 120.

In a working process, the data acquisition terminal 105 receives wireless signals emitted by various nodes 120, and reports information about the received signals as signal data to the data storage and positioning device 130, wherein the signal data may be used for describing a feature of a signal received by the data acquisition terminal 105, such as: the strength of a signal, the phase of a signal, etc. Specifically, the data acquisition terminal 105 may collect signal data from various nodes at each collection time point, and then report same to the data storage and positioning device 130. According to specific requirements, the reporting may be performed in real time, or periodically, or after a movement task is completed. No limitation is imposed on the reporting method by the present invention. In an embodiment of the present invention, the meanings of "collect" and "receive" are the same, both for indicating that the data acquisition terminal 105 receives a wireless signal from a node.

The movement task may be, for example, in a factory transport scenario, a cargo is transported from a start point to an end point, and in this scenario, the cargo or a truck for transporting the cargo is the "moving object 110". The data storage and positioning device 130 stores the signal data, and may position the moving object according to the signal data. In an embodiment of the present invention, the data acquisition terminal 105 completing a movement task refers to the data acquisition terminal 105 completing a movement in the non-network positioning system 100.

In an embodiment of the present invention, the node state detection device 140 acquires the signal data from the data storage and positioning device 130, and determines a running state of the node according to the signal data and standard signal feature information. The standard signal feature information may be stored in the data storage and positioning device 130, and may also be stored in the node state detection device 140 or other devices, as long as the node state detection device 140 is able to acquire the information in time. The data storage and positioning device 130 and the node state detection device 140 may be implemented by different physical devices or the same physical device. Alternatively, in the non-network positioning system, a certain node 120 not only has the function of emitting a signal, but also has the functions of data storage, positioning and failure diagnosis; therefore, the node 120 may integrate the state detection device 140 and/or the data storage and positioning device 130. The various variants will not be listed one by one.

Figure 1B:
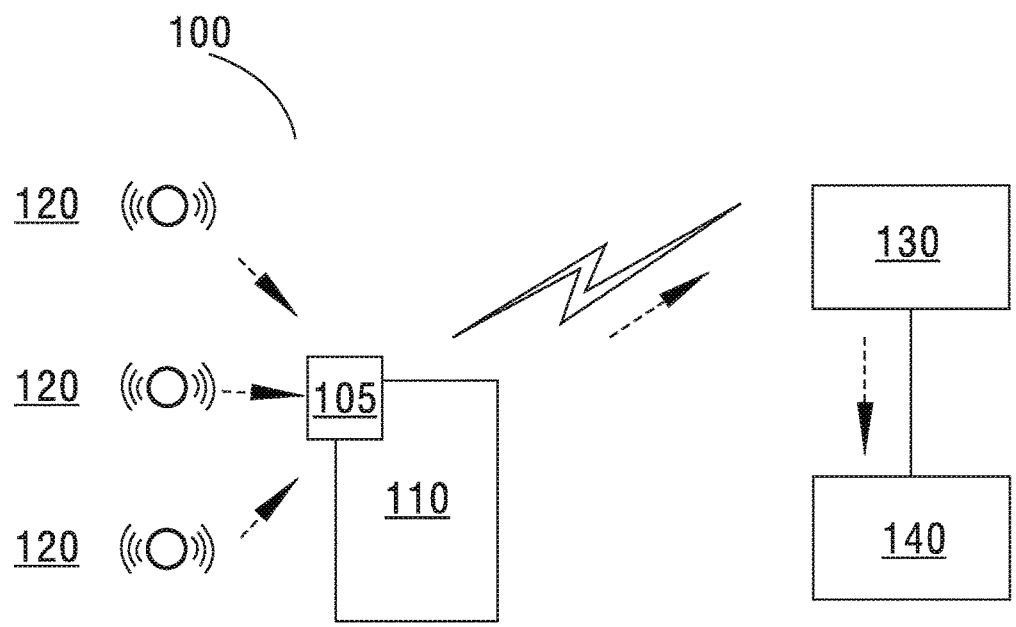
FIG. 1b is a schematic signal flow diagram of a non-network positioning system provided by an embodiment of the present invention.

FIG. 1b is a schematic signal flow diagram of a non-network positioning system provided by an embodiment of the present invention, wherein the dashed lines represent signal flows. During the movement of the moving object 110, the data acquisition terminal 105 located on the moving object 110 receives wireless signals emitted by various nodes 120 of the non-network positioning system 100, and sends signal data of these received wireless signals to the data storage and positioning device 130, and the node state detection device 140 acquires the signal data from the data storage and positioning device 130, and compares the acquired signal data with standard signal feature information, so as to determine a running state of the node.

Figure 1C:
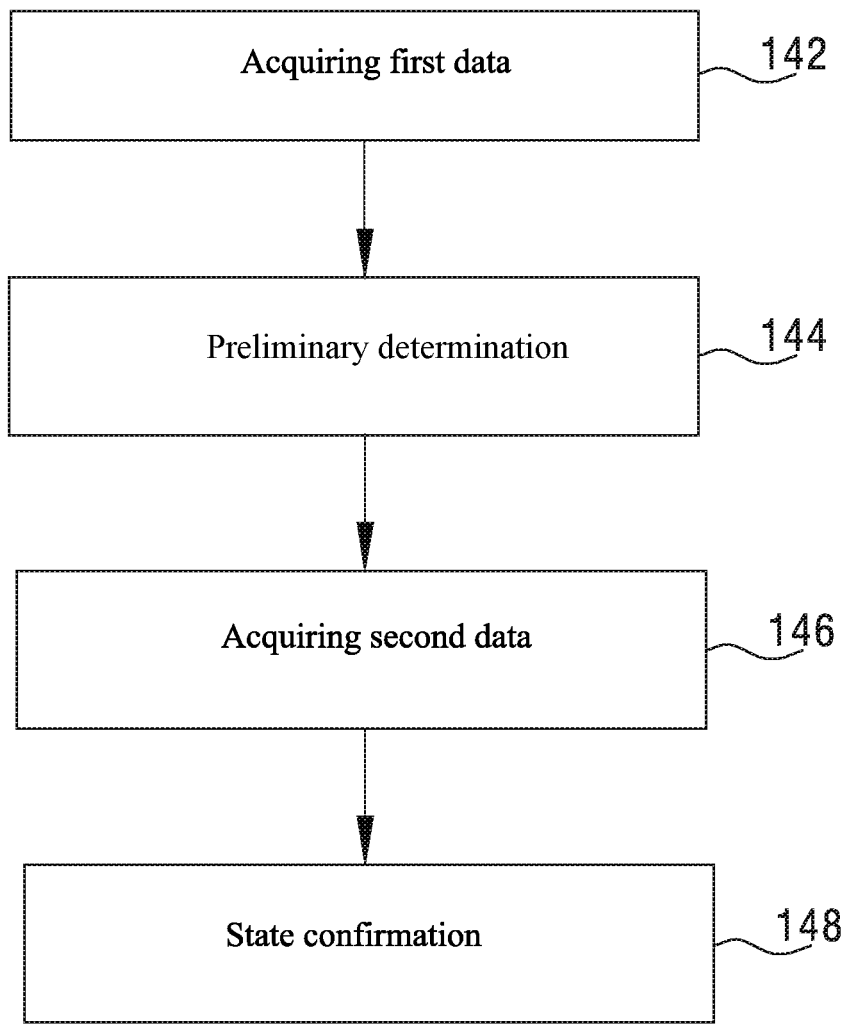
FIG. 1c is an overall flow chart of a non-network positioning system provided by an embodiment of the present invention.

FIG. 1c is an overall flow chart of a non-network positioning system of an embodiment of the present invention. This flow chart may be performed by the node state detection device 140. In order to make the detection result reliable, when the running state of a target node is determined, preliminary determination may first be performed based on the running state of the target node to obtain a first running state, and then further confirmation is performed on the running state of the target node to obtain a second running state, wherein the preliminary determination and state confirmation mentioned above may be based on different signal data. As shown in FIG. 1c, in step 142, the node state detection device 140 firstly acquires first data, and then in step 144, preliminary determination is performed, i.e. determining whether the first data has a feature indicated by corresponding standard signal feature information and then determining a first running state of the target node according to a determination result to obtain preliminary determination result. If the first running state indicates that the target node has failed, then in step 146, second data may then be further acquired, and in step 148, state confirmation is performed, i.e. determining whether the second data has a feature indicated by corresponding standard signal feature information and then determining a second running state of the target node according to a determination result to obtain a state confirmation result. If the second running state also indicates that the target node has failed, then a detection result that the target node has failed can be obtained, so that the detection result is more reliable. In the process above, the same or different feature comparison methods may be used in preliminary determination and state confirmation, wherein the first data and the second data may be data of wireless signals received by the data acquisition terminal 105 during the same movement of the non-network positioning system 100.

Figure 2:
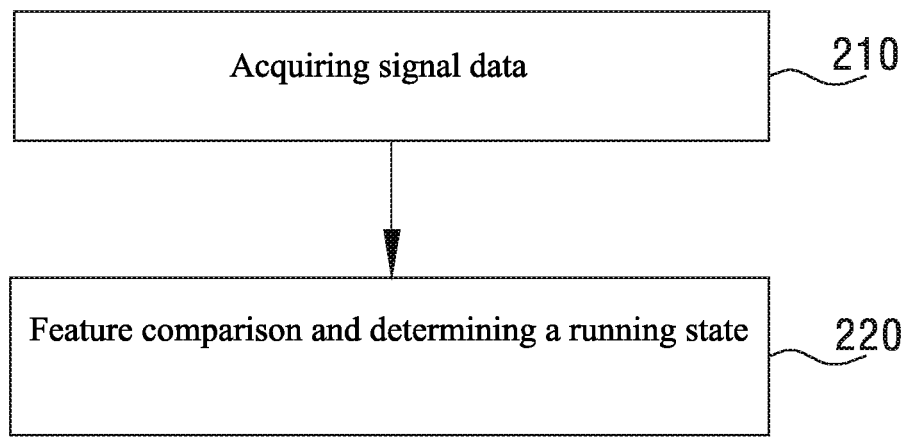
FIG. 2 is a flow chart of a node state detection method provided by an embodiment of the present invention.

As shown in FIG. 2, it is a flow chart of a node state detection method provided according to an embodiment of the present invention. The method of this embodiment may be performed by the node state detection device 140 in FIG. 1a and FIG. 1b. In step 210, signal data is acquired, the signal data comprising data of at least one wireless signal received by the data acquisition terminal 150 during one movement in the system 100, wherein the data acquisition terminal 150 passes through the target node during the movement. "One movement" here may be the latest movement, and may also be movement not too long ago, for example: the time period between the start time of the movement and the current time does not exceed a threshold value. The data acquisition terminal 105 is located on a moving object 110 to be positioned, and the signal data may be acquired from the data storage and positioning device 130. In step 220, it is determined whether the acquired signal data has a feature indicated by standard signal feature information, i.e. performing feature comparison, and then the running state of the target node is determined according to a determination result, wherein the standard signal feature information is used for indicating: a feature of data of at least one wireless signal from the target node received by the data acquisition terminal and/or another at least one data acquisition terminal, when the target node is in a normal running state. If there is no wireless signal from the target node, or the feature of the data of the wireless signal from the target node does not conform to the feature indicated by the corresponding standard signal feature information, then it can be determined that the target node has failed. After the running state of the target node is determined, operating personnel may be notified of a detection result by way of screen display or audio, etc., so the operating personnel may learn failure information in time.

In an embodiment of the present invention, the node state detection device 140 acquires the signal data from the data storage and positioning device 130 and compares the acquired signal data with standard signal feature information, so as to determine a running state of the target node, so that a failed node can be found in time, without the need to wait until artificial maintenance for the running state of the node to be diagnosed, which achieves automatic diagnosis of running states of various nodes in the non-network positioning system.

There may be a variety of trigger methods of node running state detection, and several optional trigger methods will be listed below. The practically applicable trigger methods are not limited to the examples, and these are illustrative only.

1. Running state detection for some or all nodes is triggered periodically. For example: at set intervals;

2. running state detection for some or all nodes is triggered when the system is idle; and 3. running state detection for a particular node is triggered when a certain abnormal event happens.

For example, with regard to a factory transport scenario, a transport vehicle (as an example of the moving object 110) generally should travel according to a pre-determined line; therefore, it can be determined according to the pre-determined line that the transport vehicle should pass through a certain node during working, and if it does not pass through the node, then the node may possibly have failed; or, the number of times that the transport vehicle passes through a certain node should reach a pre-determined number of times, and if the number of times does not reach the pre-determined number of times, then the node may possibly have failed. At this moment, running state detection for the node may be triggered.

According to different deployment environments, some nodes in the non-network positioning system may be visible to each other, while some nodes may be invisible to surrounding nodes. Here a node A being visible to a node B refers to the fact that a wireless signal emitted from the node A is able to be received at the node B. One possible implementation is, when the strength of a wireless signal from the node A received at the node B is greater than a pre-determined threshold value, it is considered that the node B is able to receive the wireless signal emitted from the node A, and the node A is visible to the node B.

Generally, if the node A is visible to the node B, the node B is also visible to the node B. Therefore, if one node is visible to surrounding nodes thereof, then these surrounding nodes are also visible to this node, that is to say, a wireless signal emitted from this node is able to be received in the positions of these surrounding nodes, and wireless signals emitted from the surrounding nodes are also able to be received in the position of this node. However, sometimes the case where the node A is visible to the node B while the node B is invisible to the node A may also occur. For example, when the emission power of the node A is greater than the emission power of the node B, the following scenario may possibly occur: the strength of a wireless signal from the node A received at the node B is greater than a pre-determined threshold value, while the strength of a wireless signal from the node B received at the node A is smaller than the pre-determined threshold value.

Since the positions of various nodes in the system are fixed, in the case where the various nodes are normally working, information about whether the nodes are visible to each other has been determined, and wireless signals emitted from other visible nodes received at the various nodes generally also have some features. Therefore, when the target node is a visible node (i.e. a node which is visible to surrounding nodes), a signal feature between the visible node and surrounding nodes may be utilized to perform failure diagnosis on the visible node. Feature information about a wireless signal from the target node received at surrounding nodes (referred to as "visible node signal feature information") when the target node is in a normal running state may be used as standard signal feature information for determining the running state of the visible node. In one embodiment, the visible node signal feature information is used for indicating: a feature of data of at least one wireless signal from the target node received by the data acquisition terminal when passing through at least one visible node of the target node, when the target node is in the normal running state, wherein the visible node of the target node refers to a node for which the target node is visible.

TABLE 1

Visible node signal feature information table

| | Node 01 | Node 02 | Node 03 |
|---|---|---|---|
| Node 01 | [100%, −30, −40, −25, −50, −33] | [95%, −65, −70, −60, −75, −65] | |
| Node 02 | [93%, −67, −70, −60, −75, −67] | [100%, −31, −40, −25, −50, −40] | [97%, −61, −70, −55, −75, −67] |
| Node 03 | [80%, −70, −70, −65, −75, −71] | | [100%, −26, −40, −25, −45, −32] |

As shown in Table 1, which is a visible node signal feature information table of one embodiment of the present invention, the table lists feature information about a wireless signal, which is received in the position of each node, emitted from a node which is visible to the node. The row of the table represents that the moving object 110 or the data acquisition terminal 105 is located in the position of a corresponding node, for example, "node 01" represents being located at a node 01, and "node 02" represents being located at a node 02, and so on. The column of the table represents a node that emits a signal, i.e. which node is a signal from.

Table 1 shows mutual information among three nodes of a node 01, a node 02 and a node 03. For example, data in the cell (node 01, node 02) is a feature that a wireless signal from the node 02 received by the data acquisition terminal 105 at the node 01 when the node 02 is in a normal running state should have. If two nodes are invisible to each other, then a corresponding cell is null, for example, in this embodiment, the node 01 and the node 03 are invisible to each other, then the cell (node 01, node 03) and (node 03, node 01) are both null. In Table 1, as an example, the first three numerical values of signal feature information are respectively: probability information about receiving a signal, received signal strength information and signal strength threshold value information, and the last three features are signal statistic distribution parameter information. In this embodiment, the signal strength obeys uniform distribution, and correspondingly, signal statistic distribution parameters comprise a signal strength maximum value, a signal strength minimum value and a signal strength average value; however, the embodiments of the present invention are not limited to this, and signal distribution may also use other statistical models. In Table 1, the unit of the received signal strength, signal strength threshold value, signal strength maximum value, signal strength minimum value and signal strength average value is dBm, wherein the received signal strength represents the strength of a signal received from a column-corresponding node (referred to as a column node for short) in the position of a row-corresponding node (referred to as a row node for short), and data update may be performed according to signal data collected by the data acquisition terminal. With the update of the signal data, the description for signal data features is more accurate, and the node running state is determined by utilizing the extracted signal data features after update, so that the determination result is also more accurate. The statistic distribution parameters represent a statistical law that should be satisfied by the signal collected from the column node by the data acquisition terminal when the strength of the signal collected from the row node by the data acquisition terminal is greater than the signal strength threshold value, which actually represents a statistical distribution law that should be satisfied by the signal strength of the wireless signal from the column node (which may be the same as or different from the row node) within a certain range near the row node.

For example, with regard to [95%, −65, −70, −60, −75, −65] in the cell (node 01, node 02), the signal strength threshold value is −70. When the signal strength collected from the node 01 (a row-corresponding node) by the data acquisition terminal is greater than −70, the signal strength of the wireless signal received thereby from the node 02 (a column-corresponding node) should satisfy uniform distribution where the maximum value is −60 dBm, the minimum value is −75 dBm, and the average value is −65 dBm.

In an embodiment of the present invention, the visible node signal feature information table may be obtained by analysing historical data, and may also be obtained by analysing manual detection data, for example, when the system is deployed, manual detection may be performed on signals emitted from various nodes in the positions of the various nodes, and statistical analysis is performed on the detected data, so as to obtain visible node signal feature information, wherein in the process of system running, the table may also be modified and updated. In an embodiment of the present invention, No limitation is imposed on the representation form and specific contents of the visible node signal feature information, as long as it can reflect a feature of a signal from a visible node of one node at the node.

Figure 3:
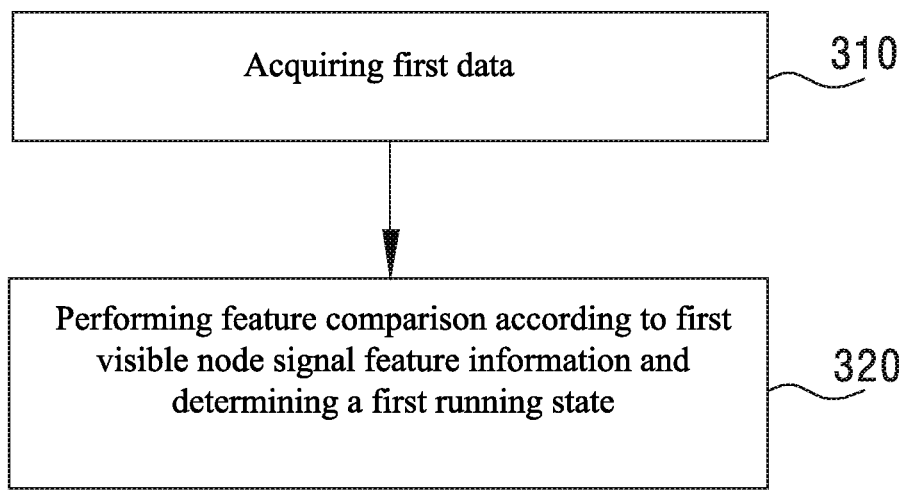
FIG. 3 is a flow chart of a node state detection method provided by an embodiment of the present invention.

As shown in FIG. 3, it is a flow chart of a node state detection method provided by an embodiment of the present invention, for detecting a running state of a target node in, for example, the non-network positioning system as shown in FIG. 1a and FIG. 1b. The method of this embodiment may be performed by the node state detection device 140 in FIG. 1a and FIG. 1b. In this embodiment, visible node signal feature information (e.g. the form of Table 1) may be utilized to determine the running state of the target node. In step 310, first data is acquired, the first data comprising data of at least one wireless signal received by the data acquisition terminal when passing through at least one first node of the at least two nodes of the non-network positioning system during the movement, wherein the target node is visible to each of the at least one first node. In step 320, it is determined whether the first data has a feature indicated by first visible node signal feature information, i.e. performing feature comparison according to the first visible node signal feature information, and then a first running state of the target node is determined according to a determination result, wherein the first visible node signal feature information is used for indicating: a feature of data of a wireless signal from the target node received by the data acquisition terminal 105 or another at least one data acquisition terminal when passing through the at least one first node, when the target node is in a normal running state.

Figure 4:
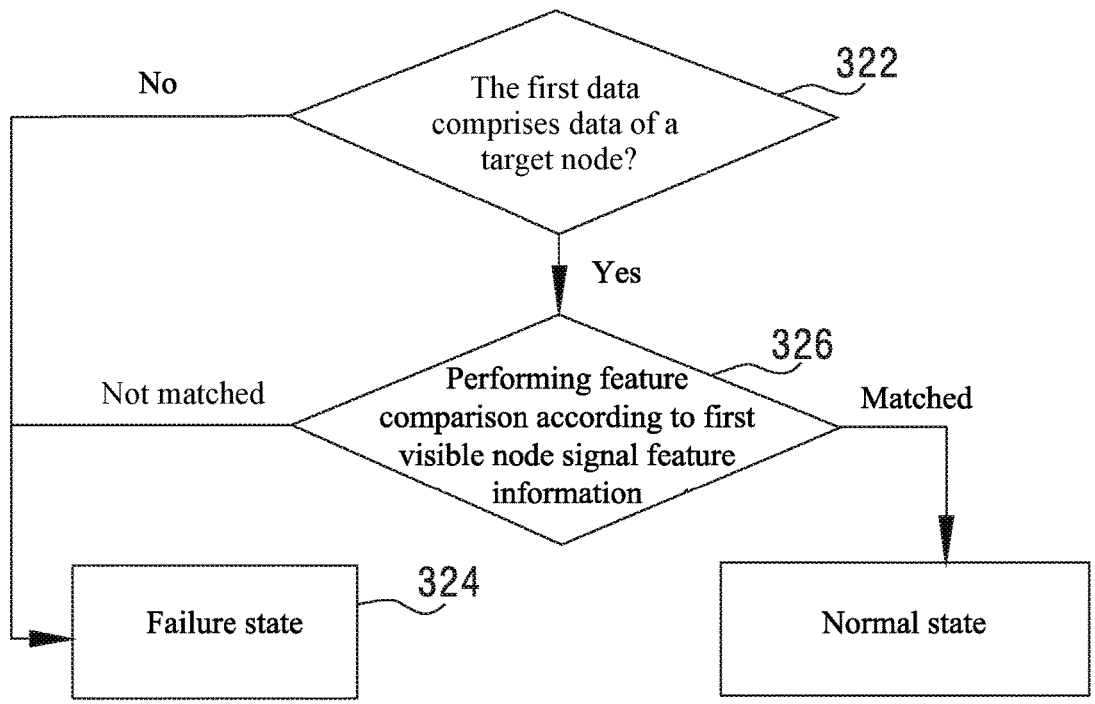
FIG. 4 is a flow chart of determining a first running state of the target node according to a determination result provided by an embodiment of the present invention.

Referring to FIG. 4, in one embodiment of the present invention, step 320 may specifically comprise the following steps. In step 322, it is determined whether the first data comprises the data of the wireless signal from the target node. If not, then the method proceeds to step 324, whereby the first running state of the target node is determined as a failure state. If so, the method proceeds to step 326, whereby it is determined whether the data of the wireless signal from the target node included in the first data has a feature indicated by the first visible node signal feature information, i.e. performing feature comparison according to the first visible node signal feature information; if the data of the wireless signal from the target node included in the first data has the feature indicated by the first visible node signal feature information, i.e. the features are matched, it is determined that the first running state of the target node is a normal state; and if the data of the wireless signal from the target node included in the first data does not have the feature indicated by the first visible node signal feature information, i.e. the features are not matched, then the method proceeds to step 324, whereby the first running state of the target node is determined as a failure state.

Description will be given by way of example with reference to Table 1 below. Taking detecting a running state of a node 02 as an example, when the node has failed, if, in one movement of the data acquisition terminal 105, the data storage and positioning device 130 determines that the data acquisition terminal 105 passes through a node 01 according to signal data corresponding to the movement, then a time period when the data acquisition terminal 105 is in the position of the node 01 can be obtained, and thus a signal collected by the data acquisition terminal 105 within this time period may be analysed. If the signal data does not comprise a wireless signal from the node 02, or the signal data comprises a wireless signal from the node 02 but the signal strength does not conform to a feature indicated by corresponding visible node signal feature information, for example, the signal strength is not stable, or the signal strength becomes weaker, etc., this indicates that the node 02 may possibly have failed. For example, it can be seen from corresponding visible node signal feature information that, in the position of the node 01, the signal strength of the wireless signal from the node 02 should conform to uniform distribution that the maximum value is −60 dBm, the minimum value is −75 dBm, and the average value is −65 dBm, and if the signal strength of the wireless signal from the node 02 in the signal data is less than −75 dBm, then it indicates that the node 02 may possibly have failed.

With regard to those nodes which are not visible to surrounding nodes, a failure state cannot be determined according to visible node signal feature information, and the reason is that these nodes and surrounding nodes are not visible to each other, and therefore signal feature information between these nodes and surrounding nodes does not exist. In one embodiment, with regard to an invisible node, a running state of a target node may be determined according to node path binding information, wherein the node path binding information is used for indicating: a feature of data of at least one wireless signal from the target node received by the data acquisition terminal 105 or another at least one data acquisition terminal when passing through a path where the target node is located, when the target node is in the normal running state,

TABLE 2

Node path binding information table

| | Node 01 | Node 02 | Node 03 |
|---|---|---|---|
| Path 01 | [A, B, 100%, −25, −50, −33] | | [A, B, 95%, −60, −75, −65] |

TABLE 2-continued

Node path binding information table

|  | Node 01 | Node 02 | Node 03 |
|---|---|---|---|
| Path 02 | [A, C, 93%, −60, −75, −67] | [A, C, 100%, −25, −50, −40] | [A, C, 97%, −55, −75, −67] |
| Path 03 |  | [D, E, 80%, −65, −75, −71] |  |

Table 2 is a node path binding information table of one embodiment of the present invention. The row of the table represents a path and the column represents a node, and data in the table is a feature of data of a wireless signal from a certain node on the path received by the data acquisition terminal 105 when the data acquisition terminal 105 passes a path. For example, the first two items in the cell (path 02, node 01) in the table are respectively a start point A of a path 02 and an end point C of the path 02, the third item is probability information about a wireless signal from a node 01 received on the path 02, and the fourth to sixth items are signal strength statistic distribution parameter information about the wireless signal from the node 01 on the path 02. Uniform distribution is used in this embodiment, and correspondingly, parameters are respectively signal strength maximum value, minimum value and average value information; however, the embodiments of the present invention are not limited to this. In Table 2, the unit of the signal strength maximum value, signal strength minimum value and signal strength average value is dBm, If one path does not pass through a certain node, or to say that one data acquisition terminal on the path cannot receive a signal of a certain node, then the corresponding cell is null. No limitation is imposed on the representation form and specific contents of the node path binding information by the present invention, as long as, when a node is in a normal running state and the data acquisition terminal 105 passes through a path where the node is located, it can reflect a feature of data of a wireless signal received from the node.

Similar to the visible node signal feature information table, the node path binding information table may also be obtained by analysing historical data or analysing manual detection data, and correspondence information between a path and a node may also be obtained by way of a geographical information system. In the process of system running, the information may also be modified and updated.

Figure 5:
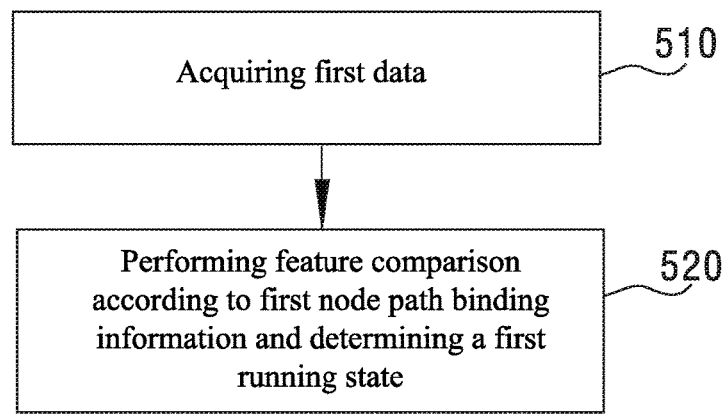
FIG. 5 is a flow chart of a node state detection method provided by an embodiment of the present invention.

As shown in FIG. 5, it is a flow chart of a node state detection method provided by an embodiment of the present invention, for detecting a running state of a target node in, for example, the non-network positioning system as shown in FIG. 1a and FIG. 1b. The method of this embodiment may be performed by the node state detection device 140 in FIG. 1a and FIG. 1b. Node path binding information is utilized to determine a running state of a target node in this embodiment. In step 510, first data is acquired, the first data comprising data of at least one wireless signal from the target node received by the data acquisition terminal 105 when passing through a first path, where the target node is located, during the movement. In step 520, it is determined whether the first data has a feature indicated by first node path binding information, i.e. performing feature comparison according to the first node path binding information, and then a first running state of the target node is determined according to a determination result, wherein the first node path binding information is used for indicating: a feature of data of at least one wireless signal from the target node received by the data acquisition terminal 105 or another at least one data acquisition terminal when passing through the first path, when the target node is in a normal running state.

Figure 6:
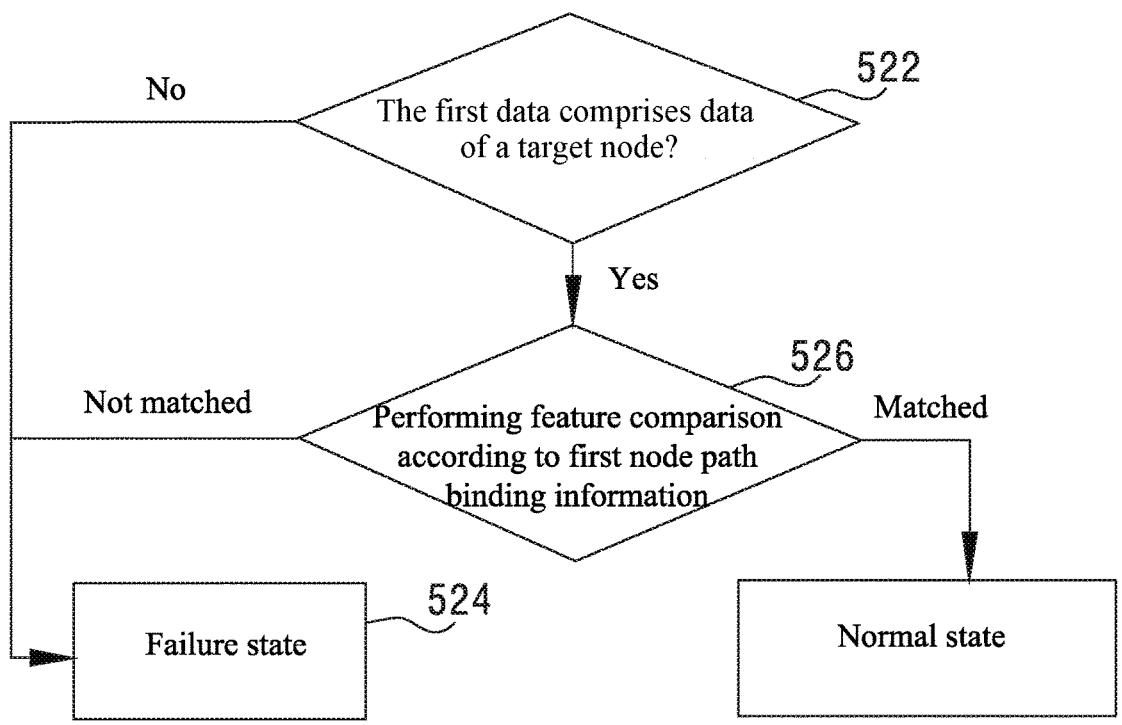
FIG. 6 is a flow chart of determining a first running state of the target node according to a determination result provided by an embodiment of the present invention.

Referring to FIG. 6, in one embodiment of the present invention, step 520 may specifically comprise the following steps. In step 522, it is determined whether the first data comprises the data of the wireless signal from the target node. If not, then the method proceeds to step 524, whereby the first running state of the target node is determined as a failure state. If so, then the method proceeds to step 526, whereby it is determined whether the data of the wireless signal from the target node included in the first data has a feature indicated by first node path binding information, i.e. performing feature comparison according to the first node path binding information. If the data of the wireless signal from the target node included in the first data has the feature indicated by the first node path binding information, i.e. the features are matched, the first running state of the target node is determined as a normal state; and if the data of the wireless signal from the target node included in the first data does not have the feature indicated by the first node path binding information, i.e. the features are not matched, then the method proceeds to step 524, whereby the first running state of the target node is determined as a failure state.

Description will be given by way of example with reference to Table 2 below. Taking detecting a running state of a node 01 as an example, if, in one movement, the data storage and positioning device 130 determines that a travel route of the data acquisition terminal 105 is from a point A to a point B, then a time period when the data acquisition terminal 105 is on the path between the point A and the point B can be seen, and it can be seen from Table 2 that the path passes through the node 01. Thus, signal data received by the data acquisition terminal 105 within this time period is analysed. If the signal data does not comprise a wireless signal from the node 01, or the signal data comprises a wireless signal from the node 01 but the signal strength does not conform to a feature indicated by corresponding visible node signal feature information, for example, the signal strength is not stable, or the signal strength becomes weaker, etc., this indicates that the node 01 may possibly have failed. For example, it can be seen from corresponding node path binding information that, on a path 01, the wireless signal from the node 01 should conform to uniform distribution that the maximum value is −25 dBm, the minimum value is −50 dBm, and the average value is −33 dBm, and if the signal strength of the wireless signal from the node 01 in the signal data is smaller than −75 dBm, then it indicates that the node 01 may possibly have failed.

The embodiments shown in FIG. 5 and FIG. 6 above may also be used for determining a running state of a visible node.

After preliminary determination is performed on the running state of the target node, further confirmation may also be performed on a determination result, so as to improve the accuracy of a detection result. After confirmation, a confirmation result may be output by way of screen display or audio, etc., so as to tell operating personnel. Various optional flows may refer to FIGS. 7-10 and relevant description.

Figure 7:
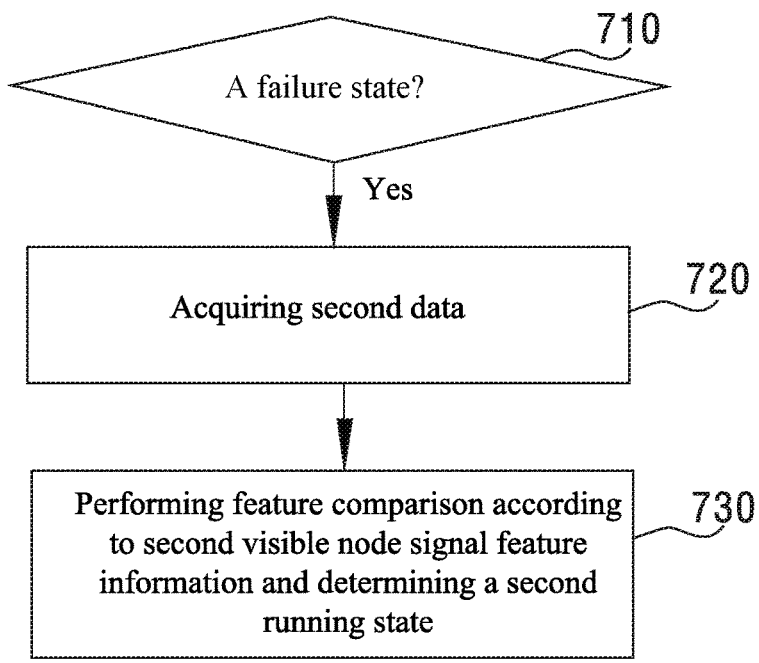
FIG. 7 is a flow chart of a state confirmation method provided by an embodiment of the present invention.

As shown in FIG. 7, it is a flow chart of a state confirmation method of an embodiment of the present invention. This embodiment may be used when the target node is a visible node. After preliminary determination is performed on the running state of the target node by utilizing visible node signal feature information, the method of this embodiment may be utilized to further confirm the running state of the target node.

The method of this embodiment may be performed by the node state detection device 140 in FIG. 1a and FIG. 1b. As shown in FIG. 7, in step 710, it is determined whether the first running state is a failure state; and if the first running state is a failure state, then the method proceeds to step 720, whereby second data is acquired, the second data comprising data of at least one wireless signal received by the data acquisition terminal 105 when passing through at least one second node in at least two nodes of a non-network positioning system during the movement, wherein the target node is visible to each of the at least one second node, and the at least one second node is different from each of the at least one first node for preliminary determination in the embodiment shown in FIG. 3. In step 730, it is determined whether the second data has a feature indicated by second visible node signal feature information, i.e. performing feature comparison according to a second visible node signal feature, and then a second running state of the target node is determined according to a determination result. The second visible node signal feature information is used for indicating: a feature of data of a wireless signal from the target node received by the data acquisition terminal 105 or another at least one data acquisition terminal when passing through the at least one second node, when the target node is in a normal running state.

Here the method for determining the second running state may be similar to the method for determining the first running state shown in FIG. 4, and the differences lie in that the acquired second data is different from the aforementioned first data, and during feature comparison, the second visible node signal feature information rather than the aforementioned first visible node information feature information is used.

According to the state confirmation method of this embodiment, after preliminary determination is performed on the running state of the target node by utilizing the data of the wireless signal from the target node received by the data acquisition terminal 105 when passing through the first node, the running state of the target node may then be further confirmed by utilizing the data of the wireless signal from the target node received by the data acquisition terminal 105 when passing through a second node which is different from the first node, so that the accuracy of a detection result can be improved.

Figure 8:
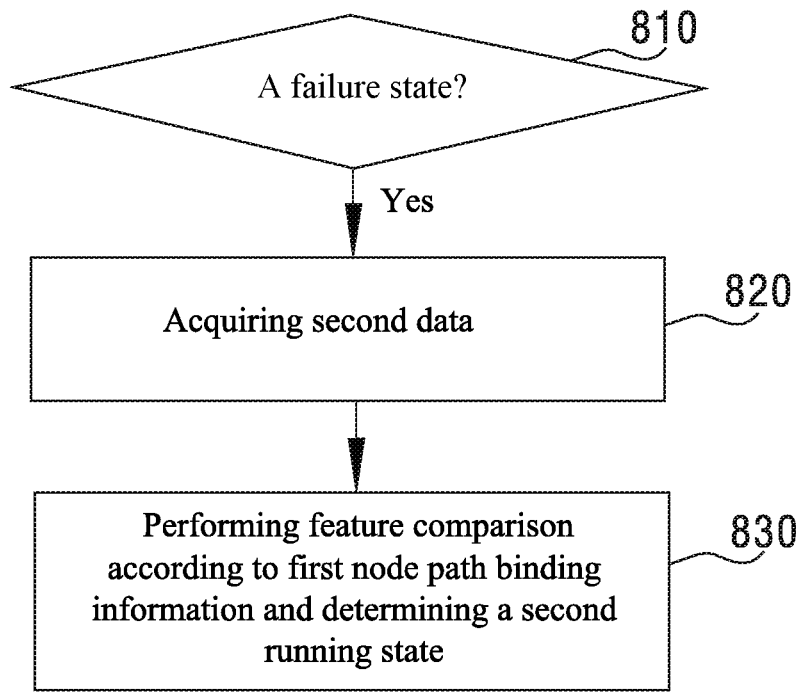
FIG. 8 is a flow chart of a state confirmation method provided by an embodiment of the present invention.

As shown in FIG. 8, it is a flow chart of a state confirmation method of another embodiment of the present invention. When the target node is a visible node, after preliminary determination is performed on the running state of the target node by utilizing visible node signal feature information, node path binding information may also be utilized to further confirm the running state of the target node.

The method of this embodiment may be performed by the node state detection device 140 in FIG. 1a and FIG. 1b. In step 810, it is determined whether the first running state is a failure state; and if the first running state is a failure state, then the method proceeds to step 820, whereby second data is acquired, the second data comprising data of at least one wireless signal from the target node received by the data acquisition terminal 105 when passing through a first path where the target node is located during the movement. Then, in step 830, it is determined whether the second data has a feature indicated by first node path binding information, i.e. performing feature comparison according to the first node path binding information, and then a second running state of the target node is determined according to a determination result, wherein the first node path binding information is used for indicating: a feature of data of at least one wireless signal from the target node received by the data acquisition terminal 105 or another at least one data acquisition terminal when passing through the first path, when the target node is in a normal running state.

Here the method for determining the second running state may be similar to the method for determining the first running state shown in FIG. 6, and when feature comparison is performed, the used first node path binding information may be the same as or may also be different from the first node path binding information used in the method shown in FIG. 6.

According to the state confirmation method of this embodiment, after preliminary determination is performed on the running state of the target node by utilizing the visible node signal feature information based on the data of the wireless signal from the target node received by the data acquisition terminal when passing through the first node, the running state of the target node may then be further confirmed by utilizing node path binding information based on the data of the wireless signal from the target node received by the data acquisition terminal 105 when passing through a first path where the target node is located, so that the accuracy of a detection result can be improved.

Figure 9:
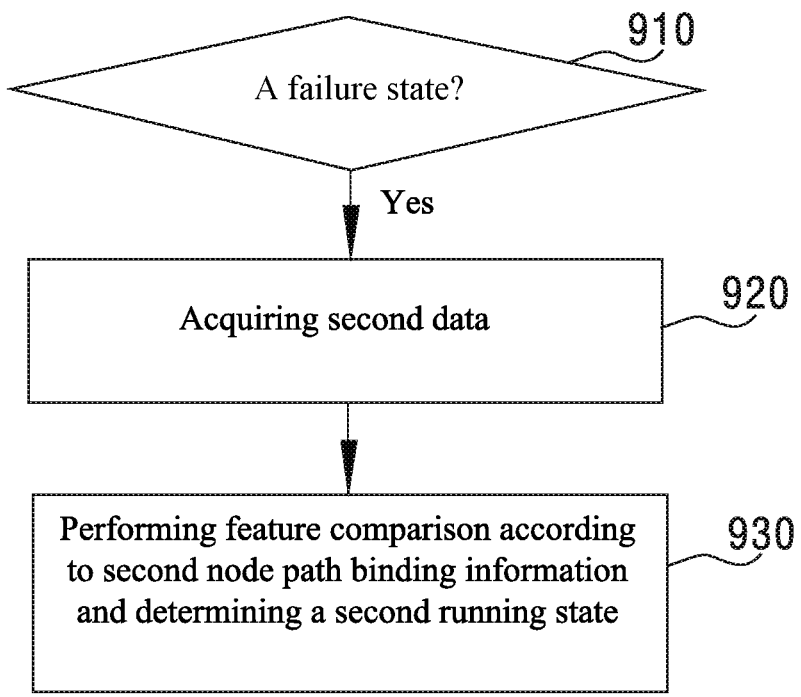
FIG. 9 is a flow chart of a state confirmation method provided by an embodiment of the present invention.

As shown in FIG. 9, it is a flow chart of a state confirmation method of another embodiment of the present invention. After preliminary determination is performed on the running state of the target node by utilizing the data of the wireless signal from the target node received by the data acquisition terminal when passing through the first path where the target node is located and utilizing the node path binding information as shown in FIG. 5, the running state of the target node may be further confirmed by utilizing the node path binding information based on the data of the wireless signal from the target node received by the data acquisition terminal 105 when passing through a second path where the target node is located.

The method of this embodiment may be performed by the node state detection device 140 in FIG. 1a and FIG. 1b. In step 910, it is determined whether the first running state is a failure state; and if the first running state is a failure state, then the method proceeds to step 920, whereby second data is acquired, the second data comprising data of at least one wireless signal from the target node received by the data acquisition terminal 105 when passing through a second path where the target node is located during the movement, wherein the second path is different from the first path. Then, in step 930, it is determined whether the second data has a feature indicated by second node path binding information, i.e. performing feature comparison according to the second node path binding information, and then a second running state of the target node is determined according to a determination result, wherein the second node path binding information is used for indicating: a feature of data of at least one wireless signal from the target node received by the data acquisition terminal 105 or another at least one data acquisition terminal when passing through the second path, when the target node is in a normal running state.

Here the method for determining the second running state may be similar to the method for determining the first running state shown in FIG. 6, and the differences may lie in that the acquired data is data of at least one wireless signal from the target node received by the data acquisition terminal 105 when passing through the second path rather than the first path; and when feature comparison is performed, the second node path binding information rather than the first node path binding information is used.

According to the state confirmation method of this embodiment, after preliminary determination is performed on the running state of the target node by utilizing the data of the wireless signal from the target node received by the data acquisition terminal when passing through the first path where the target node is located, the running state of the target node may then be further confirmed based on the wireless signal from the target node received by the data acquisition terminal 105 when passing through a second path where the target node is located, so that the accuracy of a detection result can be improved.

In addition, when the target node is a visible node, after preliminary determination is performed on the first running state of the target node by utilizing the node path binding information based on the data of the wireless signal from the target node received by the data acquisition terminal when passing through the first path where the target node is located as a failure state, the running state of the target node may then be further confirmed by utilizing the visible node signal feature information based on the wireless signal from the target node received by the data acquisition terminal 105 when passing through a first node, wherein the target node is visible to the first node. The specific method is similar to the method of the embodiments shown in FIG. 3 and FIG. 4.

Figure 10:
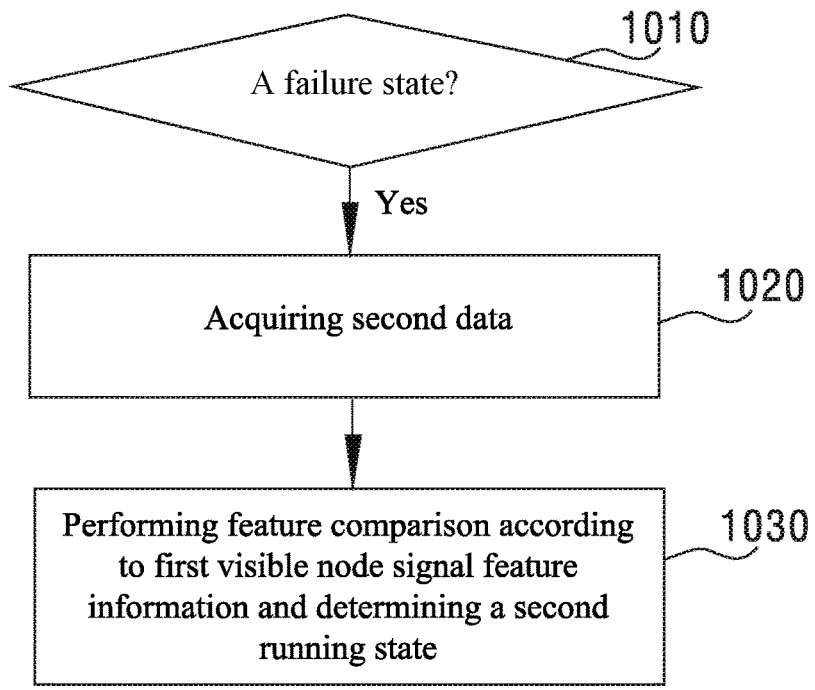
FIG. 10 is a flow chart of a state confirmation method provided by an embodiment of the present invention.

As shown in FIG. 10, in step 1010, it is determined whether the first running state is a failure state. if the first running state is a failure state, then the method proceeds to step 1020, whereby second data is acquired, the second data comprising data of at least one wireless signal received by the data acquisition terminal 105 when passing through at least one first node in at least two nodes during the movement, wherein the target node is visible to each of the at least one first node. Then, the method proceeds to step 1030, whereby it is determined whether the second data has a feature indicated by first visible node signal feature information, i.e. performing feature comparison according to the first visible node signal feature information, and then a second running state of the target node is determined according to a determination result, wherein the first visible node signal feature information is used for indicating: a feature of data of a wireless signal from the target node received by the data acquisition terminal 105 or another at least one data acquisition terminal when passing through the at least one first node, when the target node is in a normal running state, The method for determining the second running state may be similar to the method for determining the first running state shown in FIG. 4, and when feature comparison is performed, the used first visible node signal feature information may be the same as or may also be different from the first visible node signal feature information used in the method shown in FIG. 4.

According to the state confirmation method of this embodiment, after preliminary determination is performed on the first running state of the target node by utilizing the node path binding information based on the data of the wireless signal from the target node received by the data acquisition terminal when passing through the first path where the target node is located as a failure state, the running state of the target node may then be further confirmed by utilizing the visible node signal feature information based on the wireless signal from the target node received by the data acquisition terminal 105 when passing through a first node, so that the accuracy of a detection result can be improved. After it is determined or confirmed that the target node has failed, signal data received by the data acquisition terminal 105 and standard signal feature information may further be utilized to determine whether the data acquisition terminal 105 passes through the target node which has failed, or whether a set path is completed, and a determination result may be output by way of screen display or audio, etc., so as to tell operating personnel.

In the case where the target node has failed, whether the data acquisition terminal 105 passes through the target node may further be determined according to data of wireless signals from various nodes 12 of the non-network positioning system 100 received by the data acquisition terminal 105. Here the target node having failed may comprise: the running state, first running state and/or second running state of the target node are a failure state.

When the target node is visible, whether the data acquisition terminal 105 passes through the target node may be determined according to signal data and visible node signal feature information.

Figure 11:
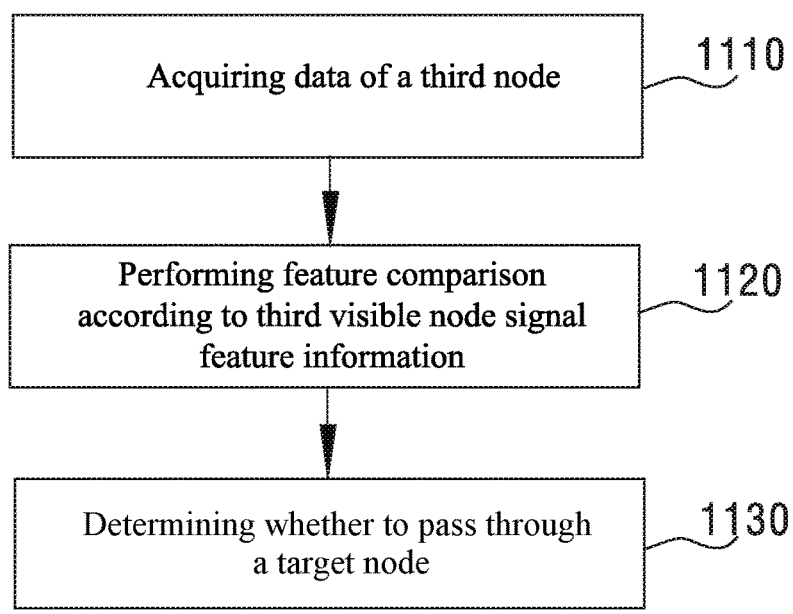
FIG. 11 is a flow chart of determining whether a data acquisition terminal passes through a target node by utilizing visible node signal feature information provided by an embodiment of the present invention.

FIG. 11 is a flow chart of determining whether the acquisition terminal 105 passes through a target node by utilizing visible node signal feature information provided by an embodiment of the present invention, which can be performed by the node state detection device 140 in FIG. 1*a* and FIG. 1*b*.

In step 1110, data of a wireless signal from at least one third node in at least two nodes in the non-network positioning system 100 received by the data acquisition terminal 105 is acquired, wherein the at least one third node is visible to the target node. In step 1120, it is determined whether the data of at least one wireless signal from the at least one third node comprises data having a feature indicated by third visible node signal feature information, i.e. performing feature comparison according to the third visible node signal feature information, wherein the third visible node signal feature information of one third node is used for indicating: when the third node is in a normal running state, a feature of data of a wireless signal from the third node received by the data acquisition terminal 105 or another at least one data acquisition terminal when passing through the target node. In step 1130, whether the data acquisition terminal 105 passes the target node during movement is determined according to a determination result. Specifically, if the data of the at least one wireless signal from the at least one third node comprises the data having the feature indicated by the third visible node signal feature information, it is determined that the data acquisition terminal 105 passes through the target node; and if not, it is determined that the data acquisition terminal 105 does not pass through the target node.

Description will be given by way of example with reference to Table 1 below. Taking detecting a running state of a node 02 as an example, after it is determined that the node has failed, all the data collected by the data acquisition terminal 105 during movement of a moving object may be analysed, and this time period analysed may be the whole journey rather than a time period when the data acquisition terminal 105 is at a certain node. If data at a certain moment in the data is found to contain the following information: the signal strength of a wireless signal from a node 01 is −66 dBm (between −75 dBm and −60 dBm), and at the same time the signal strength of a wireless signal from a node 03 is −63 dBm (between −75 dBm and −55 dBm), which indicates that, at that moment, in the position where the data acquisition terminal 105 is located, the collected signal data of surrounding nodes not only conforms to a feature of data of the wireless signal from the node 01 received when passing through the node 02, but also conforms to a feature of data of the wireless signal received from the node 03 when passing through the node 02, then it may be considered that the data acquisition terminal 105 has been located in the position of the node 02 which has failed at that moment. Thus, even if there is a node that has failed, whether the data acquisition terminal 105 passes through the position of the node which has failed may also be determined according to signal data received from surrounding nodes of the node by the data acquisition terminal 105, and thus whether the data acquisition terminal 105 has completed a set path may be determined, so that the non-network positioning system has a self-healing ability, and the reliability of the non-network positioning system is improved.

In addition, when the target node has failed, a path through which the acquisition terminal 105 passes may further be confirmed by utilizing node path binding information, and whether it passes through the target node is determined, and such a method may not only be used when the target node is visible, but may also be used when the target node is invisible. The node path binding information is used for indicating a node through which each path passes, which may be obtained from the node path binding information table as shown in Table 2, and may also be a table which is stored separately.

Figure 12:
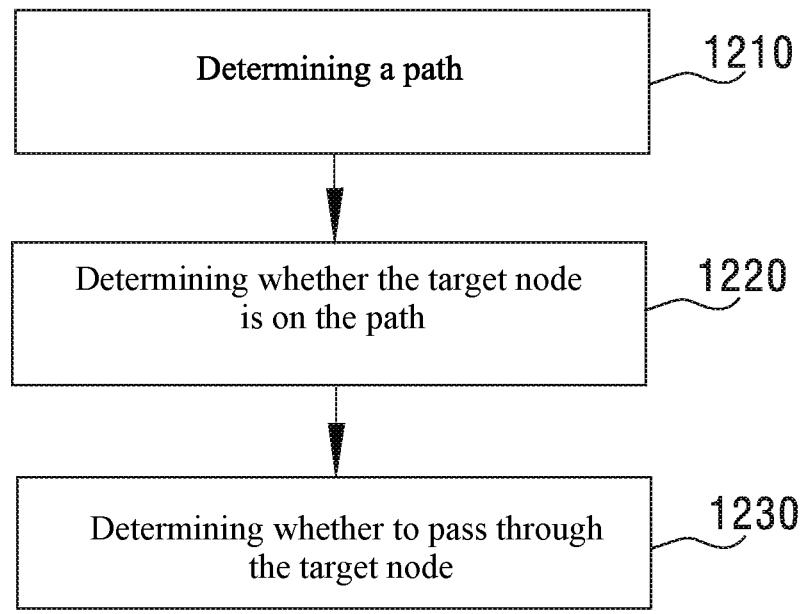
FIG. 12 is a flow chart of determining whether a data acquisition terminal passes through a target node by utilizing node path binding information provided by an embodiment of the present invention.

FIG. 12 is a flow chart of determining whether a data acquisition terminal 105 passes through a target node by utilizing node path binding information provided by an embodiment of the present invention. In step 1210, a path through which the data acquisition terminal passes during the movement is determined. The path may be determined by the data storage and positioning device 130 using the existing positioning algorithm according to data of all the wireless signals received by the data terminal during the movement, and then it may be acquired by the node state detection device 140 from the data storage and positioning device 130. In step 1220, whether the target node is on the path is determined. Then, the method proceeds to step 1230, whereby whether the data acquisition terminal 105 passes through the target node is determined according to the determination result. If the target node is on the path, it is determined that the acquisition terminal 105 passes through the target node, and if the target node is not on the path, it is determined that the acquisition terminal 105 does not pass through the target node. Thus, even if there is a node that has failed, a movement path of the data acquisition terminal 105 may also be determined according to signal data collected by the data acquisition terminal 105, and thus it is determined whether it passes through the node that has failed, so that the non-network positioning system has a self-healing ability, and the reliability of the non-network positioning system is improved.

Figure 13:
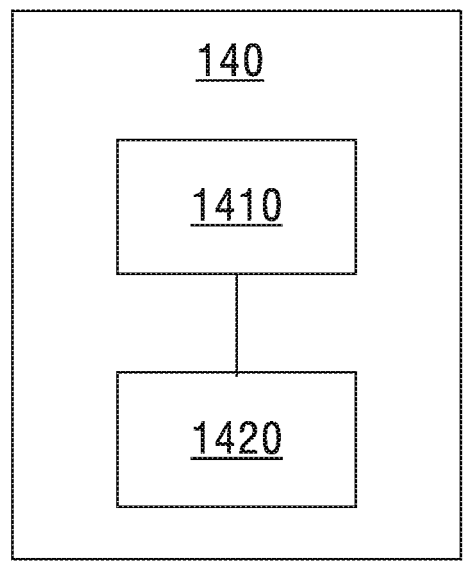
FIG. 13 is a schematic structural diagram of a node state detection device provided by an embodiment of the present invention.

As shown in FIG. 13, it is a schematic structural diagram of a node state detection device provided by an embodiment of the present invention. The node detection device 140 is used for performing the node state detection method in the aforementioned embodiments. The node state detection device 140 comprises a first acquisition module 1410 and a first determination module 1420. The first acquisition module 1410 is used for acquiring signal data, the signal data comprising data of at least one wireless signal received by a data acquisition terminal 105 during one movement within the system, wherein the data acquisition terminal 105 passes through the target node during the movement. The first determination module 1420 is used for determining whether the acquired signal data has a feature indicated by standard signal feature information, and determining the running state of the target node according to a determination result, wherein the standard signal feature information is used for indicating: a feature of data of at least one wireless signal from the target node received by the data acquisition terminal 105 or another at least one data acquisition terminal, when the target node is in a normal running state.

In addition, the node detection device 140 may further comprise a result output module (not shown) for outputting a determination result by way of screen display or audio, etc., so that operating personnel may learn failure information in time.

The node state detection device for a non-network positioning system provided by the embodiment of the present invention determines, by acquiring data of a wireless signal from a node of a non-network positioning system received by a data acquisition terminal 105 on a moving object during movement and comparing the signal data with standard signal feature information, a running state of the target node, so that a failed node can be found in time, without the need to wait until artificial maintenance for the running state of the node to be diagnosed, which achieves automatic diagnosis of running states of various nodes in the non-network positioning system.

The standard signal feature information used when the first determination module 1420 determines whether the acquired signal data has a feature indicated by standard signal feature information comprises visible node signal feature information and/or node path binding information. The visible node signal feature information is used for indicating: when the target node is in the normal running state, a feature of data of at least one wireless signal from the target node received by the data acquisition terminal 105 or another at least one data acquisition terminal when passing through at least one visible node of the target node. The node path binding information is used for indicating: when the target node is in the normal running state, a feature of data of at least one wireless signal from the target node received by the data acquisition terminal 105 or another at least one data acquisition terminal when passing through a path where the target node is located. In this way, a variety of modes of node running state determination are provided by determining the running state of the target node by way of the data of the wireless signal received by the data acquisition terminal from the visible node of the target node or on the path where the target node is located. Either the visible node of the target node or the path where the target node is located are related to the target node. By discovering and extracting a feature of information about the visible node and the path related to the target node, and determining whether the data of the signal from the target node received by the node acquisition terminal during the movement of the non-network positioning system has the feature, the target node is associated with the other nodes in the non-network positioning system, thereby effectively achieving node failure determination.

In one embodiment, when the target node is visible, visible node signal feature information is utilized to preliminarily determine the running state of the target node. The first acquisition module 1410 may be used for acquiring first data, the first data comprising data of at least one wireless signal received by the data acquisition terminal 105 when passing through at least one first node of the at least two nodes of the non-network positioning system during the movement, wherein the target node is visible to each of the at least one first node. The first determination module 1420 is used for determining whether the first data has first visible node signal feature information, and determining a first running state of the target node according to the determination result, wherein the first visible node signal feature information is used for indicating: a feature of data of a wireless signal from the target node received by the data acquisition terminal 105 or another at least one data acquisition terminal when passing through the at least one first node, when the target node is in a normal running state.

In one embodiment, the first determination module 1420 may specifically be used for: if the first data does not comprise the data of the wireless signal from the target node, determining the first running state of the target node as a failure state; and if the first data comprises the data of the wireless signal from the target node, determining whether the data of the wireless signal from the target node included in the first data has the feature indicated by the first visible node signal feature information, and if not, determining the first running state of the target node as a failure state.

In one embodiment, node path binding information is utilized to preliminarily determine a running state of a target node. The first acquisition module 1410 may be used for acquiring first data, here the first data comprising data of at least one wireless signal from the target node received by the data acquisition terminal 105 when passing through a first path, where the target node is located, during the movement. The first determination module 1420 may be used for determining whether the first data has a feature indicated by first node path binding information, and determining a first running state of the target node according to the determination result, wherein the first node path binding information is used for indicating: a feature of data of at least one wireless signal from the target node received by the data acquisition terminal 105 or another at least one data acquisition terminal when passing through the first path, when the target node is in a normal running state.

In one embodiment, the first determination module 1420 may be used for: if the first data does not comprise the data of the wireless signal from the target node, determining the first running state of the target node as a failure state; and if the first data comprises the data of the signal from the target node, determining whether the data of the wireless signal from the target node included in the first data has the feature indicated by the first node path binding information, and if not, determining the first running state of the target node as a failure state.

Figure 14:
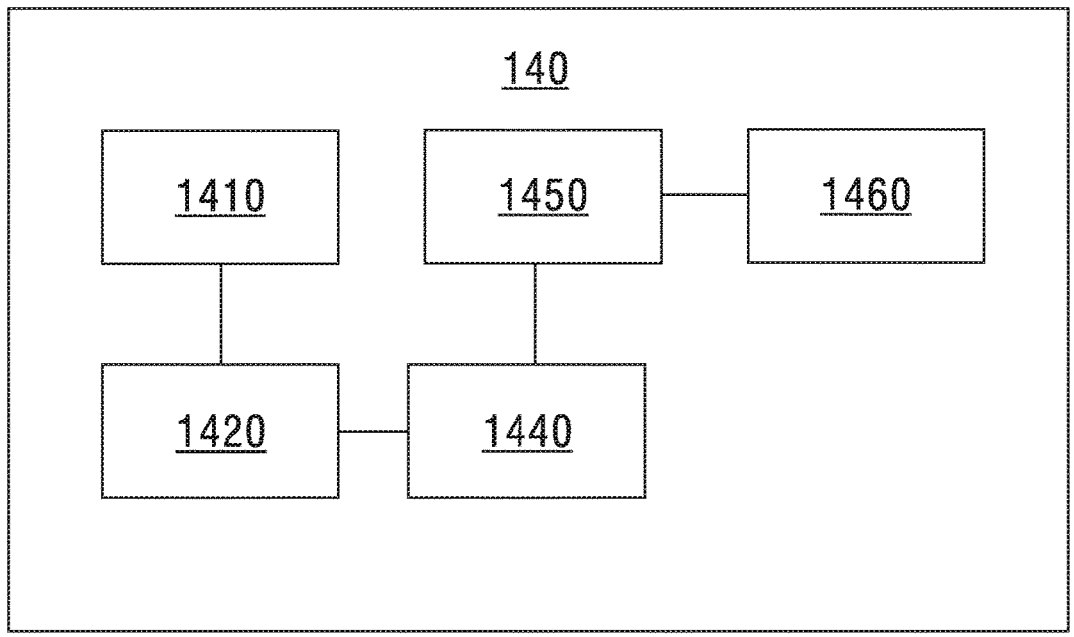
FIG. 14 is a schematic structural diagram of a node state detection device provided by another embodiment of the present invention.

As shown in FIG. 14, it is a schematic structural diagram of a node state detection device provided according to another embodiment of the present invention. In this embodiment, the node state detection device 140 further comprises a second determination module 1440, a second acquisition module 1450 and a third determination module 1460, wherein the second determination module 1440 is used for determining whether the first running state is a failure state. The second acquisition module 1450 is used for acquiring second data when the first running state is a failure state, wherein the second data is different from the first data mentioned above. The third determination module 1460 is used for determining whether the second data has a feature indicated by corresponding visible node signal feature information or node path binding information, and determining a second running state of the target node according to the determination result. In this embodiment, the running state of the target node may further be confirmed when it is preliminarily determined that the first running state of the target node is a failure state. The second acquisition module 1450 and the third determination module 1460 will be described in detail below.

In one embodiment, after preliminary determination is performed on the running state of the target node by utilizing visible node signal feature information to obtain the first running state, visible node signal feature information may then be utilized to further confirm the running state of the target node. This embodiment is applicable when the target node is visible. Specifically, the second acquisition module 1450 may be used for acquiring second data when the first running state is a failure state, the second data comprising data of at least one wireless signal received by the data acquisition terminal 105 when passing through at least one second node in at least two nodes during the movement, wherein the target node is visible to each of the at least one second node, and the at least one second node is different from each of the at least one first node. The third determination module 1460 may be used for determining whether the second data has a feature indicated by second visible node signal feature information, and determining a second running state of the target node according to the determination result, wherein the second visible node signal feature information is used for indicating: a feature of data of a wireless signal from the target node received by the data acquisition terminal 105 or another at least one data acquisition terminal when passing through the at least one second node, when the target node is in a normal running state. In this embodiment, the way for the third determination module 1460 to determine the second running state may be similar to the way for the first determination module 1420 to determine the first running state in the embodiment above where preliminary determination is performed on the running state of the target node based on visible node signal feature information, and the difference only lies in that when feature comparison is performed, the second visible node signal feature information rather than the first visible node signal feature information is used.

In one embodiment, after preliminary determination is performed on the running state of the target node by utilizing visible node signal feature information to obtain the first running state, node path binding information may then be utilized to further confirm the running state of the target node. This embodiment is applicable when the target node is visible. Specifically, the second acquisition module 1450 may be used for acquiring second data when the first running state is a failure state, the second data comprising data of at least one wireless signal from the target node received by the data acquisition terminal 105 when passing through a first path where the target node is located during the movement. The third determination module 1460 may be used for determining whether the second data has a feature indicated by first node path binding information, and determining a second running state of the target node according to the determination result, wherein the first node path binding information is used for indicating: a feature of data of at least one wireless signal from the target node received by the data acquisition terminal 105 or another at least one data acquisition terminal when passing through the first path, when the target node is in a normal running state. In this embodiment, the way for the third determination module 1460 to determine the second running state may be similar to the way for the first determination module 1420 to determine the first running state in the embodiment above where preliminary determination is performed on the running state of the target node based on node path binding information, and the used first node path binding information may be the same as or different from the first node path binding information used by the first determination module 1420.

In one embodiment, after preliminary determination is performed on the running state of the target node by utilizing node path binding information to obtain the first running state, node path binding information may then be utilized to further confirm the running state of the target node. This embodiment is applicable when the target node is visible and is also applicable when the target node is invisible.

Specifically, the second acquisition module 1450 may be used for acquiring second data when the first running state is a failure state, the second data comprising data of at least one wireless signal from the target node received by the data acquisition terminal 105 when passing through a second path where the target node is located during the movement, wherein the second path is different from the first path. The third determination module 1460 may be used for determining whether the second data has a feature indicated by second node path binding information, and determining a second running state of the target node according to the determination result, wherein the second node path binding information is used for indicating: a feature of data of at least one wireless signal from the target node received by the data acquisition terminal 105 or another at least one data acquisition terminal when passing through the second path, when the target node is in a normal running state. In this embodiment, the way for the third determination module 1460 to determine the second running state may be similar to the way for the first determination module 1420 to determine the first running state in the embodiment above where preliminary determination is performed on the running state of the target node based on node path binding information, and the difference only lies in that when feature comparison is performed, the second node path binding information rather than the first node path binding information is used.

In one embodiment, after preliminary determination is performed on the running state of the target node by utilizing node path binding information to obtain the first running state, visible node signal feature information may be utilized to further confirm the running state of the target node. This embodiment is applicable when the target node is visible. Specifically, the second acquisition module 1450 may be used for acquiring second data when the first running state is a failure state, the second data comprising data of at least one wireless signal received by the data acquisition terminal 105 when passing through at least one first node of the at least two nodes during the movement, wherein the target node is visible to each of the at least one first node. The third determination module 1460 may be used for determining whether the second data has a feature indicated by first visible node signal feature information, and determining a second running state of the target node according to the determination result, wherein the first visible node signal feature information is used for indicating: a feature of data of a wireless signal from the target node received by the data acquisition terminal 105 or another at least one data acquisition terminal when passing through the at least one first node, when the target node is in a normal running state. In this embodiment, the way for the third determination module 1460 to determine the second running state may be similar to the way for the first determination module 1420 to determine the first running state in the embodiment above where preliminary determination is performed on the running state of the target node based on visible node signal feature information, and when feature comparison is performed, the used first visible node signal feature information may be the same as or different from the first visible node signal feature information used by the first determination module 1420.

Figure 15:
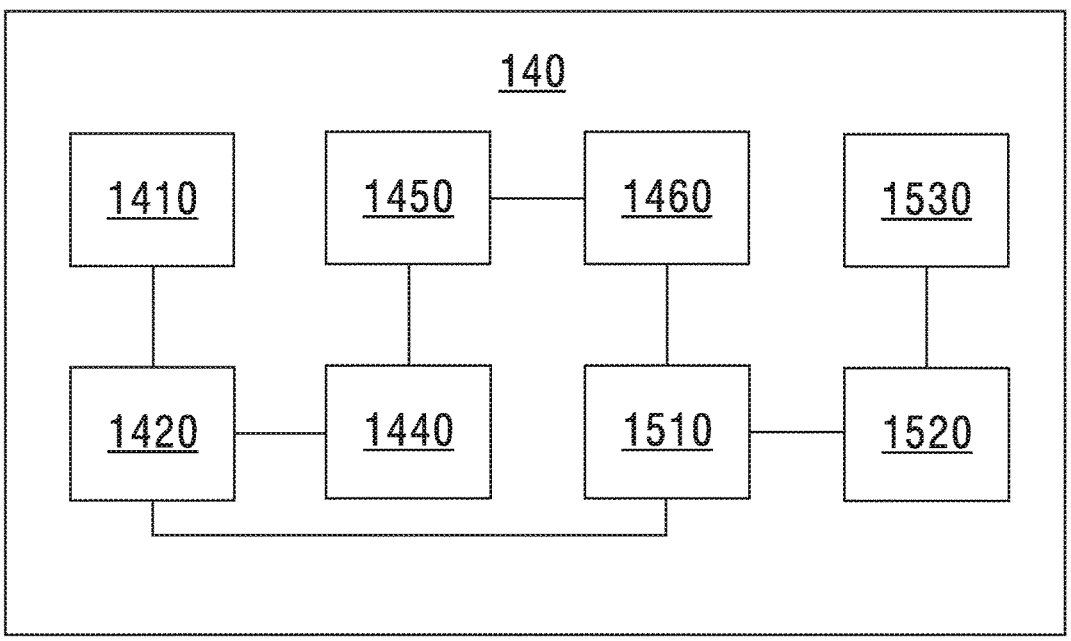
FIG. 15 is a schematic structural diagram of a node state detection device provided by yet another embodiment of the present invention.

As shown in FIG. 15, it is a schematic structural diagram of a node state detection device provided by another embodiment of the present invention. The node state detection device of this embodiment may determine whether the data acquisition terminal 105 passes through the target node during movement by utilizing visible node signal feature information in the case where the target node has failed, which is applicable when surrounding nodes of the target node are visible to the target node. The node state detection device 140 in this embodiment may further comprise a third acquisition module 1510, a fourth determination module 1520 and a first determination module 1530. The third acquisition module 1510 may be used for acquiring data of at least one wireless signal received by the data acquisition terminal 105 from at least one third node of the at least two nodes during the movement when the running state of the target node is determined as a failure state according to the determination result, wherein the at least one third node is visible to the target node. The fourth determination module 1520 may be used for determining whether the acquired data of the at least one wireless signal from the at least one third node of the at least two nodes comprises data having third visible node signal feature information, wherein the third visible node signal feature information about one third node is used for indicating: when the third node is in a normal running state, a feature of data of a wireless signal from the third node received by the data acquisition terminal and/or another at least one data acquisition terminal when passing through the target node. The first determination module 1530 may be used for determining whether the data acquisition terminal 105 passes through the target node during the movement according to the determination result of the fourth determination module. Specifically, if the acquired data of the at least one wireless signal from the at least one third node of the at least two nodes comprises the data having the third visible node signal feature information, it may be determined that the data acquisition terminal 105 passes through the target node during movement, and if not, then it may be determined that the data acquisition terminal 105 does not pass through the target node during movement.

Figure 16:
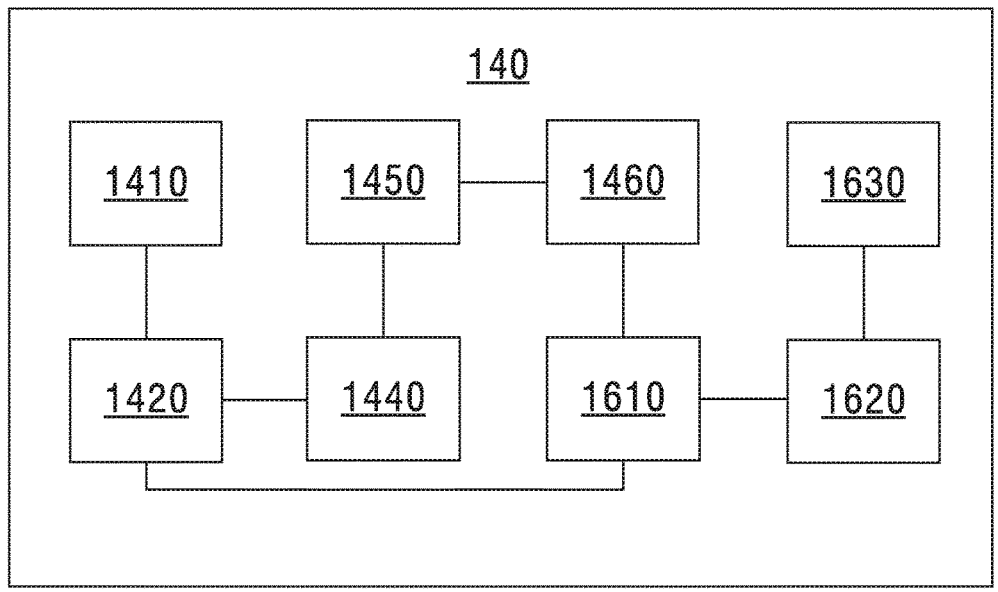
FIG. 16 is a schematic structural diagram of a node state detection device provided by yet another embodiment of the present invention.

As shown in FIG. 16, it is a schematic structural diagram of a node state detection device provided by another embodiment of the present invention. The node state detection device of this embodiment may determine whether the data acquisition terminal 105 passes through the target node during movement by utilizing node path binding information in the case where the target node has failed, which is applicable when surrounding nodes of the target node are visible to the target node, and is also applicable when the surrounding nodes are invisible. The node state detection device 140 in this embodiment may further comprise a second determination module 1610, a fifth determination module 1620 and a third determination module 1630. The second determination module 1610 may be used for determining a path through which the data acquisition terminal 105 passes during the movement when the running state of the target node is determined as a failure state according to the determination result. The path may also be determined by the data storage and positioning device 130 using the existing positioning algorithm according to data of all the wireless signals received by the data acquisition terminal during the movement, and then it may be acquired by the node state detection device 140 from the data storage and positioning device 130. The fifth determination module 1620 may be used for determining whether the target node is on the determined path. The third determination module 1630 may be used for determining whether the data acquisition terminal 105 passes through the target node according to the determination result. Specifically, if the target node is on the determined path, then it may be determined that the data acquisition terminal 105 passes through the target node during the movement, and if not, then it may be determined that the data acquisition terminal 105 does not pass through the target node during the movement.

According to another embodiment of the present invention, the node state detection device 140 may further comprise a signal feature maintenance module (not shown), for analysing historical signal data, manual detection data and/or geographical information system information to establish the standard signal feature information, and it may also be used for modifying and updating the standard signal feature information.

Figure 17:
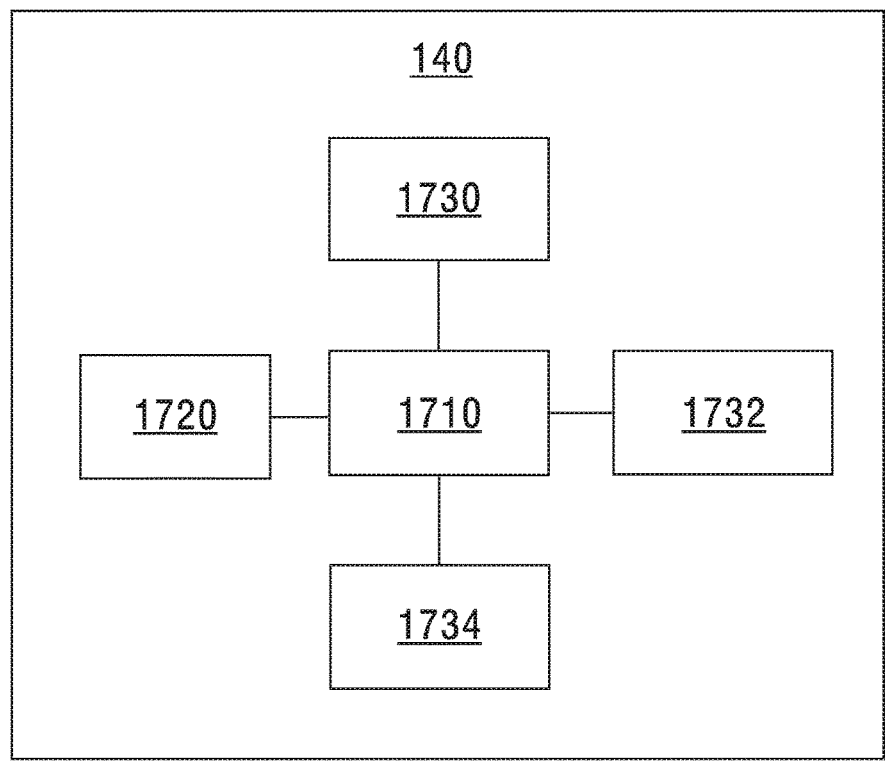
FIG. 17 is a schematic structural diagram of a node state detection device provided by yet another embodiment of the present invention.

As shown in FIG. 17, it is a schematic structural diagram of the node state detection device 140 of another embodiment of the present invention. The node state detection device may comprise at least one processor 1710, at least one memory 1720 and one or more interfaces 1730, 1732 and 1734 as shown in FIG. 17. The processor 1710 may be any component capable of performing computations and/or other processing related tasks, and the memory 1710 may be any component capable of storing programs and/or instructions for the processor 1720. The interfaces 1730, 1732 and 1734 may be any component or component set allowing a communication device 1000 to communicate with other devices. In this embodiment, the memory 1720 may store a program comprising computer executable instructions, and the processor 1720 is used for calling the program to perform all or some of the steps in the method embodiments mentioned above.

The detailed description with regard to the device embodiments above may refer to relevant description of the aforementioned method embodiments.

Those of ordinary skill in the art may understand: some or all of the steps for implementing the various method embodiments mentioned above may be completed by a program instructing relevant hardware. The aforementioned program may be stored in a computer readable storage medium. When the program is running, the steps comprising the various method embodiments mentioned above are performed; and the aforementioned storage medium comprises: any medium that can store program code, such as a ROM, a RAM, a magnetic disk, or an optical disc.

The foregoing description is only preferred embodiments of the present invention and is not used for limiting the present invention, and that various other changes, equal substitutions and modifications without departing from the spirit and principle of the present invention are intended to be included within the scope of protection of the present invention.

The patent claims of the application are formulation proposals without prejudice for obtaining more extensive patent protection. The applicant reserves the right to claim even further combinations of features previously disclosed only in the description and/or drawings.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims. Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

None of the elements recited in the claims are intended to be a means-plus-function element within the meaning of 35 U.S.C. § 112(f) unless an element is expressly recited using the phrase "means for" or, in the case of a method claim, using the phrases "operation for" or "step for."

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A method of detecting a running state of a target node of at least two nodes included in a non-network positioning system, the at least two nodes being respectively located in different positions within the non-network positioning system and the at least two nodes being configured to send a wireless signal, the method comprising:
    acquiring signal data, the signal data including data of at least one wireless signal received by a data acquisition terminal during one movement within the non-network positioning system where the data acquisition terminal passes through a coverage range of the target node during the one movement;
    determining whether the acquired signal data includes a feature indicated by standard signal feature information and producing a determination result; and
    determining the running state of the target node based on the standard signal feature information by analyzing a feature of data of at least one wireless signal from the target node received by one or more of the data acquisition terminal or another data acquisition terminal, when the data acquisition terminal passes through the coverage range of at least one visible node of the target node and the target node is the normal running state,
    wherein the standard signal feature information is usable for indicating at least one of:
        a feature of data of at least one wireless signal from the target node received by the data acquisition terminal; and
        another at least one data acquisition terminal, upon the target node being in the normal running state.

2. The method of claim 1, wherein the standard signal feature information further includes node path binding information, and wherein
    the node path binding information is used for indicating at least one of: a feature of data of at least one wireless signal from the target node received by the data acquisition terminal and another at least one data acquisition terminal when passing through a path where the target node is located, when the target node is in the normal running state.

3. The method of claim 1, wherein the acquiring of signal data comprises:
    acquiring first data, the first data comprising data of at least one wireless signal received by the data acquisition terminal when passing through at least one first node of the at least two nodes during the movement, the target node being visible to each of the at least one first node; and the determining of whether the acquired signal data includes a feature indicated by standard signal feature information and the determining of the running state of the target node according to a determination result comprise:
- determining whether the first data includes a feature indicated by first visible node signal feature information, and determining a first running state of the target node according to the determination result, wherein the first visible node signal feature information is used for indicating at least one of: a feature of data of a wireless signal from the target node received by the data acquisition terminal and another at least one data acquisition terminal when passing through the at least one first node, when the target node is in a normal running state.

4. The method of claim 3, wherein the determining of whether the first data includes a feature indicated by first visible node signal feature information, and the determining of a first running state of the target node according to the determination result comprise:
- determining, upon the first data does not including the data of the wireless signal from the target node, the first running state of the target node as a failure state; and
- determining, upon the first data including the data of the wireless signal from the target node, whether the data of the wireless signal from the target node included in the first data includes the feature indicated by the first visible node signal feature information, and if not, determining the first running state of the target node as a failure state.

5. The method of claim 2, wherein the standard signal feature information comprises node path binding information; and wherein
- the acquiring of signal data comprises acquiring first data, the first data comprising data of at least one wireless signal from the target node received by the data acquisition terminal when passing through a first path, where the target node is located, during the movement; and
- wherein the determining of whether the acquired signal data includes a feature indicated by standard signal feature information and determining the running state of the target node according to a determination result comprises:
  - determining whether the first data includes a feature indicated by first node path binding information, and determining a first running state of the target node according to the determination result, wherein the first node path binding information is used for indicating at least one of: a feature of data of at least one wireless signal from the target node received by the data acquisition terminal and another at least one data acquisition terminal when passing through the first path, when the target node is in a normal running state.

6. The method of claim 5, wherein the determining of whether the first data includes a feature indicated by first node path binding information, and the determining of a first running state of the target node according to the determination result comprise:
- determining, upon the first data not including the data of the wireless signal from the target node, the first running state of the target node as a failure state; and
- determining, upon the first data including the data of the signal from the target node, whether the data of the wireless signal from the target node included in the first data includes the feature indicated by the first node path binding information, and if not, determining the first running state of the target node as a failure state.

7. The method of claim 3, wherein, after the determining of the first running state of the target node, the method further comprises:
- determining whether the first running state is a failure state; and
- upon the first running state being a failure state,
  - acquiring second data, the second data including data of at least one wireless signal received by the data acquisition terminal when passing through at least one second node of the at least two nodes during the movement, wherein the target node is visible to each of the at least one second node, and the at least one second node is different from each of the at least one first node; and
  - determining whether the second data includes a feature indicated by second visible node signal feature information, and determining a second running state of the target node according to the determination result, wherein the second visible node signal feature information is used for indicating at least one of: a feature of data of a wireless signal from the target node received by the data acquisition terminal and another at least one data acquisition terminal when passing through the at least one second node, when the target node is in a normal running state.

8. The method of claim 3, wherein, after the determining of the first running state of the target node, the method further comprises:
- determining whether the first running state is a failure state; and
- upon the first running state being a failure state,
  - acquiring second data, the second data including data of at least one wireless signal from the target node received by the data acquisition terminal when passing through a first path where the target node is located during the movement; and
  - determining whether the second data includes a feature indicated by first node path binding information, and determining a second running state of the target node according to the determination result, wherein the first node path binding information is used for indicating at least one of: a feature of data of at least one wireless signal from the target node received by the data acquisition terminal and another at least one data acquisition terminal when passing through the first path, when the target node is in a normal running state.

9. The method of claim 5, wherein, after the determining of the first running state of the target node, the method further comprises:
- determining whether the first running state is a failure state; and
- upon the first running state being a failure state,
  - acquiring second data, the second data including data of at least one wireless signal from the target node received by the data acquisition terminal when passing through a second path where the target node is located during the movement, wherein the second path is different from the first path; and
  - determining whether the second data includes a feature indicated by second node path binding information, and determining a second running state of the target node according to the determination result, wherein the second node path binding information is used for indicating at least one of: a feature of data of at least one wireless signal from the target node received by the data acquisition terminal and another at least one data acquisition terminal when passing through the second path, when the target node is in a normal running state.

10. The method of claim 5, wherein, after the determining of the first running state of the target node, the method further comprises:
   determining whether the first running state is a failure state; and
   upon the first running state being a failure state,
      acquiring second data, the second data including data of at least one wireless signal received by the data acquisition terminal when passing through at least one first node of the at least two nodes during the movement, wherein the target node is visible to each of the at least one first node; and
      determining whether the second data includes a feature indicated by first visible node signal feature information, and determining a second running state of the target node according to the determination result, wherein the first visible node signal feature information is used for indicating at least one of: a feature of data of a wireless signal from the target node received by the data acquisition terminal and another at least one data acquisition terminal when passing through the at least one first node, when the target node is in a normal running state.

11. The method of claim 1, wherein, after the determining of the running state of the target node as a failure state according to the determination result, the method further comprises:
   acquiring data of at least one wireless signal from at least one third node of the at least two nodes received by the data acquisition terminal during the movement, wherein the at least one third node is visible to the target node;
   determining whether the acquired data of the at least one wireless signal from the at least one third node includes data having a feature indicated by third visible node signal feature information, wherein the third visible node signal feature information about one third node is used for indicating at least one of: a feature of data of a wireless signal from the third node received by the data acquisition terminal and another at least one data acquisition terminal when passing through the target node, when the third node is in a normal running state; and
   upon the acquired data of the at least one wireless signal from the at least one third node including the data having the feature indicated by the third visible node signal feature information, determining that the data acquisition terminal passes through the target node during the movement.

12. The method of claim 1, wherein, after the determining of the running state of the target node as a failure state according to the determination result, the method further comprises:
   determining a path through which the data acquisition terminal passes during the movement;
   determining whether the target node is on the determined path; and
   upon the target node being on the determined path, determining that the data acquisition terminal passes through the target node during the movement.

13. A node state detection device for detecting a running state of a target node of at least two nodes included in a non-network positioning system, the at least two nodes being located in different positions within the system respectively and the at least two nodes being configured to send a wireless signal, the node state detection device comprising:
   at least one memory to store a program including computer executable instructions; and
   at least one processor to call the program to perform:
      acquiring signal data, the signal data comprising data of at least one wireless signal received by a data acquisition terminal one movement within the system where the data acquisition terminal passes through a coverage area of the target node during the movement;
      determining whether the acquired signal data includes a feature indicated by standard signal feature information; and
      determining the running state of the target node based on the standard signal feature information by analyzing a feature of data of at least one wireless signal from the target node received by one or more of the data acquisition terminal or another data acquisition terminal, when the data acquisition terminal passes through the coverage range of at least one visible node of the target node and the target node is the normal running state,
         wherein the standard signal feature information is used for indicating at least one of: a feature of data of at least one wireless signal from the target node received by the data acquisition terminal and another at least one data acquisition terminal, when the target node is in a normal running state.

14. The device of claim 13, wherein, after calling the program to determine the running state of the target node as a failure state according to the standard signal feature information, the device is further used to call the program to:
   acquire data of at least one wireless signal from at least one third node of the at least two nodes received by the data acquisition terminal during the movement, wherein the at least one third node is visible to the target node;
   determine whether the acquired data of the at least one wireless signal from the at least one third node includes data having a feature indicated by third visible node signal feature information, wherein the third visible node signal feature information about one third node is used for indicating at least one of: a feature of data of a wireless signal from the third node received by the data acquisition terminal and another at least one data acquisition terminal when passing through the target node, when the third node is in a normal running state; and
   determining, upon the acquired data of the at least one wireless signal from the at least one third node including the data having the feature indicated by the third visible node signal feature information, that the data acquisition terminal passes through the target node during the movement.

15. The device of claim 13, wherein, after calling the program to determine the running state of the target node as a failure state according to the standard signal feature information, the device is further used to call the program to:
   determine a path through which the data acquisition terminal passes during the movement;
   determine whether the target node is on the determined path; and determine, upon the target node being on the determined path, that the data acquisition terminal passes through the target node during the movement.

16. A non-transitory computer readable medium, the computer readable medium storing computer instructions thereon, the computer instructions, when executed by a processor, causing the processor to:
   detect a running state of a target node of at least two nodes included in a non-network positioning system, the at least two nodes being respectively located in different positions within the non-network positioning system and the at least two nodes being configured to send a wireless signal, the processor configured to detect the running state by,
      acquiring signal data, the signal data including data of at least one wireless signal received by a data acquisition terminal during one movement where the data acquisition terminal passes through a coverage range of the target node during the movement;
      determining whether the acquired signal data includes a feature indicated by standard signal feature information; and
      determining the running state of the target node based on the standard signal feature information by analyzing a feature of data of at least one wireless signal from the target node received by one or more of the data acquisition terminal or another data acquisition terminal, when the data acquisition terminal passes through the coverage range of at least one visible node of the target node and the target node is a normal running state,
   wherein the standard signal feature information is used for indicating at least one of:
      a feature of data of at least one wireless signal from the target node received by the data acquisition terminal; and
      another at least one data acquisition terminal, when the target node is in the normal running state.

17. A non-transitory machine-readable data carrier including program code for carrying out the method of claim 1 when the program code is run on a computer.

18. A non-transitory machine-readable data carrier including program code for carrying out the method of claim 2 when the program code is run on a computer.

19. A non-transitory machine-readable data carrier including program code for carrying out the method of claim 3 when the program code is run on a computer.

20. A non-transitory machine-readable data carrier including program code for carrying out the method of claim 5 when the program code is run on a computer.

* * * * *